US008025764B2

(12) United States Patent  (10) Patent No.: US 8,025,764 B2
Bhat et al.  (45) Date of Patent: *Sep. 27, 2011

(54) MULTI-PLY PAPER PRODUCT WITH MOISTURE STRIKE THROUGH RESISTANCE AND METHOD OF MAKING THE SAME

(75) Inventors: Dinesh M. Bhat, Neenah, WI (US); Daniel W. Sumnicht, Green Bay, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/872,763

(22) Filed: Aug. 31, 2010

(65) Prior Publication Data

US 2010/0319864 A1 Dec. 23, 2010

Related U.S. Application Data

(60) Division of application No. 12/618,124, filed on Nov. 13, 2009, which is a continuation of application No. 10/995,457, filed on Nov. 22, 2004, now Pat. No. 7,799,169.

(60) Provisional application No. 60/611,671, filed on Sep. 20, 2004, provisional application No. 60/606,674, filed on Sep. 1, 2004.

(51) Int. Cl.
*B31F 1/07* (2006.01)
*D21H 27/32* (2006.01)
*D21H 21/16* (2006.01)

(52) U.S. Cl. ........ 162/117; 162/109; 162/125; 162/127; 162/132; 162/158; 162/164.1; 162/168.1; 162/172; 156/60; 156/219

(58) Field of Classification Search .................. 162/109, 162/117, 123–133, 158, 162, 164.1, 164.3, 162/164.6, 168.1, 168.3, 165–166, 172, 175, 162/178–179, 181.1, 135; 428/156, 172, 428/195.1, 537.5; 424/402; 156/60, 209, 156/219

See application file for complete search history.

(56) References Cited

U.S. PATENT DOCUMENTS

| | | | |
|---|---|---|---|
| 1,682,346 A | 8/1928 | Lorenz | |
| 2,117,256 A | 5/1938 | Rafton | |
| 2,123,982 A | 7/1938 | Wiles | |
| 2,142,986 A | 1/1939 | Arnold, Jr. | |
| 2,755,213 A | 7/1956 | Hedstrom | |
| 2,797,168 A | 6/1957 | Gimler | |
| 2,824,815 A | 2/1958 | Downs et al. | |
| 2,961,367 A | 11/1960 | Weisgerber et al. | |
| 3,084,092 A | 4/1963 | Arlt, Jr. | |
| 3,130,111 A | 4/1964 | Izumi | |
| 3,212,961 A | 10/1965 | Weisgerber et al. | |
| 3,261,740 A | 7/1966 | Wells | |
| 3,414,459 A | 12/1968 | Wells | |
| 3,546,716 A | 12/1970 | Laumann | |
| 3,554,195 A | 1/1971 | Murdoch | |
| 3,607,348 A | 9/1971 | Wray | |
| 3,612,054 A | 10/1971 | Matsuda et al. | |
| 3,650,882 A | 3/1972 | Thomas | |
| 3,654,064 A | 4/1972 | Laumann | |
| 3,673,060 A | 6/1972 | Murphy et al. | |
| 3,684,603 A | 8/1972 | Iltins | |
| 3,833,937 A | 9/1974 | Taylor | |
| 3,867,225 A | 2/1975 | Nystrand | |
| 3,868,205 A | 2/1975 | Thomas | |
| 3,916,447 A | 11/1975 | Thompson | |
| 3,925,127 A | 12/1975 | Yoshioka | |
| 3,926,700 A | 12/1975 | Hopkins, Jr. et al. | |
| 3,953,638 A | 4/1976 | Kemp | |
| 3,960,272 A | 6/1976 | Hartbauer et al. | |
| 3,978,553 A | 9/1976 | Honig | |
| 4,018,647 A | 4/1977 | Wietsma | |
| 4,071,651 A | 1/1978 | Hicklin et al. | |
| 4,074,959 A | 2/1978 | Curry et al. | |
| 4,075,382 A | 2/1978 | Chapman et al. | |
| 4,100,017 A | 7/1978 | Flautt | |

(Continued)

FOREIGN PATENT DOCUMENTS

DE  10342201 A1 * 4/2005

(Continued)

OTHER PUBLICATIONS

Hardell, Hanne-Lise et al., "A New Method for the Analysis of AKD Oligomers in Papermaking Systems," 17 Nordic Pulp and Paper Research Journal 3, 340-345 (2002).
Papermaking and Paperboard Making, Roland G. MacDonald & John N. Franklin, eds., 50-55 (2nd ed., 1970).
Search Report from related European Application No. 05019027.
Office Action dated Jun. 23, 2008, issued in co-pending U.S. Appl. No. 10/995,457.
Office Action dated Apr. 9, 2009, issued in co-pending U.S. Appl. No. 10/995,457.
Office Action dated Dec. 16, 2009, issued in co-pending U.S. Appl. No. 10/995,457.

(Continued)

*Primary Examiner* — José A Fortuna
(74) *Attorney, Agent, or Firm* — Laura L. Bozek

(57) ABSTRACT

A paper product with absorbency and moisture strike through resistance is disclosed. More particularly, a multi-ply paper product with improved strike through resistance is disclosed, wherein at least one ply is a wetting resistant ply comprising at least one wetting resistant compound and at least one ply is an absorbent ply possessing greater absorbency than the wetting resistant ply. In addition, a two-ply paper napkin with improved moisture strike through resistance is disclosed, wherein the wetting resistant ply comprises alkyl ketene dimer and the two plies are separately microembossed, glue laminated together in a point to point configuration, and macroembossed with coin edging. Furthermore, a multi-ply paper product with improved strike through resistance is disclosed, wherein a first ply comprises at least one wetting resistant compound and a second ply possesses greater absorbency than the first ply. Methods of making paper products with absorbency and moisture strike through resistance are also described.

47 Claims, 6 Drawing Sheets

U.S. PATENT DOCUMENTS

| | | |
|---|---|---|
| 4,113,911 A | 9/1978 | LaFitte et al. |
| 4,117,199 A | 9/1978 | Gotoh et al. |
| 4,145,464 A | 3/1979 | McConnell et al. |
| 4,196,245 A | 4/1980 | Kitson et al. |
| 4,276,339 A | 6/1981 | Stoveken |
| 4,287,251 A | 9/1981 | King et al. |
| 4,288,877 A | 9/1981 | Klepfer |
| 4,302,853 A | 12/1981 | Mesek |
| 4,330,888 A | 5/1982 | Klepfer |
| 4,349,610 A | 9/1982 | Parker |
| 4,377,615 A | 3/1983 | Suzuki et al. |
| 4,447,484 A | 5/1984 | Slosberg et al. |
| 4,469,735 A | 9/1984 | Trokhan |
| 4,489,118 A | 12/1984 | Endres et al. |
| 4,537,822 A | 8/1985 | Nanri et al. |
| 4,559,243 A | 12/1985 | Pässler et al. |
| 4,574,021 A | 3/1986 | Endres et al. |
| 4,601,938 A | 7/1986 | Deacon et al. |
| 4,610,915 A | 9/1986 | Crenshaw et al. |
| 4,618,524 A | 10/1986 | Groitzsch et al. |
| 4,637,949 A | 1/1987 | Manning et al. |
| 4,648,876 A | 3/1987 | Becker et al. |
| 4,657,538 A | 4/1987 | Becker et al. |
| 4,657,946 A | 4/1987 | Rende et al. |
| 4,660,224 A | 4/1987 | Ashcraft |
| 4,695,422 A | 9/1987 | Curro et al. |
| 4,786,367 A | 11/1988 | Bogart et al. |
| 4,788,100 A | 11/1988 | Janssen et al. |
| 4,789,564 A | 12/1988 | Kanner et al. |
| 4,806,183 A | 2/1989 | Williams |
| 4,816,320 A | 3/1989 | St. Cyr |
| 4,885,202 A | 12/1989 | Lloyd et al. |
| 4,924,527 A | 5/1990 | Hintermeyer |
| 4,927,588 A | 5/1990 | Schulz |
| 4,938,515 A | 7/1990 | Fazio |
| 4,950,545 A | 8/1990 | Walter et al. |
| 4,987,632 A | 1/1991 | Rowe et al. |
| 5,062,158 A | 11/1991 | Oka et al. |
| 5,093,068 A | 3/1992 | Schulz |
| 5,128,182 A | 7/1992 | Bunker et al. |
| 5,158,523 A | 10/1992 | Houk et al. |
| 5,167,766 A | 12/1992 | Honig et al. |
| 5,171,808 A | 12/1992 | Ryles et al. |
| 5,173,351 A | 12/1992 | Ruppel et al. |
| 5,180,471 A | 1/1993 | Sauer et al. |
| 5,196,244 A | 3/1993 | Beck |
| 5,223,096 A | 6/1993 | Phan et al. |
| 5,227,242 A | 7/1993 | Walter et al. |
| 5,252,754 A | 10/1993 | Bottorff |
| 5,260,536 A | 11/1993 | Peery |
| 5,397,435 A | 3/1995 | Ostendorf et al. |
| 5,399,366 A | 3/1995 | Geddes et al. |
| 5,407,537 A | 4/1995 | Malatesta et al. |
| 5,437,766 A | 8/1995 | Van Phan et al. |
| 5,437,908 A | 8/1995 | Demura et al. |
| 5,443,889 A | 8/1995 | Ruppel et al. |
| 5,449,551 A | 9/1995 | Taniguchi |
| 5,456,968 A | 10/1995 | Jones |
| 5,467,936 A | 11/1995 | Moody |
| 5,503,919 A | 4/1996 | Litchholt et al. |
| 5,514,435 A | 5/1996 | Suzuki et al. |
| 5,543,202 A | 8/1996 | Clark et al. |
| 5,550,167 A | 8/1996 | DesMarais |
| 5,552,187 A | 9/1996 | Green et al. |
| 5,552,200 A | 9/1996 | Gureff |
| 5,560,945 A | 10/1996 | Geddes et al. |
| 5,562,805 A * | 10/1996 | Kamps et al. .................. 162/117 |
| 5,563,179 A | 10/1996 | Stone et al. |
| 5,571,849 A | 11/1996 | DesMarais |
| 5,578,369 A | 11/1996 | Nohr et al. |
| 5,582,674 A | 12/1996 | Patterson et al. |
| 5,585,129 A | 12/1996 | Geddes et al. |
| 5,595,807 A | 1/1997 | Gooding, Jr. et al. |
| 5,601,871 A | 2/1997 | Krzysik et al. |
| 5,601,930 A | 2/1997 | Mehta et al. |
| 5,609,901 A | 3/1997 | Geddes et al. |
| 5,614,293 A | 3/1997 | Krzysik et al. |
| 5,622,734 A | 4/1997 | Clark et al. |
| 5,635,201 A | 6/1997 | Fabo |
| 5,635,279 A | 6/1997 | Ma et al. |
| 5,650,218 A | 7/1997 | Krzysik et al. |
| 5,658,639 A | 8/1997 | Curro et al. |
| 5,665,426 A | 9/1997 | Krzysik et al. |
| 5,693,406 A | 12/1997 | Wegele et al. |
| 5,695,487 A | 12/1997 | Cohen et al. |
| 5,695,608 A | 12/1997 | Yagi et al. |
| 5,698,291 A | 12/1997 | Clark et al. |
| 5,716,692 A | 2/1998 | Warner et al. |
| 5,736,223 A | 4/1998 | Laurent |
| 5,766,736 A | 6/1998 | Baumuller |
| 5,792,404 A | 8/1998 | Cree et al. |
| 5,830,558 A | 11/1998 | Barnholtz |
| 5,849,000 A | 12/1998 | Anjur et al. |
| 5,851,352 A | 12/1998 | Vinson et al. |
| 5,858,173 A | 1/1999 | Propst, Jr. |
| 5,858,554 A | 1/1999 | Neal et al. |
| 5,864,878 A | 2/1999 | Mashrick |
| 5,882,464 A | 3/1999 | Theisgen et al. |
| 5,885,697 A | 3/1999 | Krzysik et al. |
| 5,904,812 A | 5/1999 | Salman et al. |
| 5,906,711 A | 5/1999 | Barnholtz |
| 5,919,556 A | 7/1999 | Barnholtz |
| 5,930,836 A | 8/1999 | Morris |
| 5,932,316 A | 8/1999 | Cree et al. |
| 5,968,853 A | 10/1999 | Kelly et al. |
| 5,990,377 A | 11/1999 | Chen et al. |
| 6,015,935 A | 1/2000 | LaVon et al. |
| 6,025,049 A | 2/2000 | Ouellette et al. |
| 6,027,611 A | 2/2000 | McFarland et al. |
| 6,030,497 A | 2/2000 | Watkins |
| 6,045,900 A | 4/2000 | Haffner et al. |
| 6,046,378 A | 4/2000 | Quincy, III et al. |
| 6,054,020 A | 4/2000 | Goulet et al. |
| 6,066,379 A | 5/2000 | Ma et al. |
| 6,074,525 A | 6/2000 | Richards |
| 6,107,539 A | 8/2000 | Palumbo et al. |
| 6,129,972 A | 10/2000 | McNeil et al. |
| 6,132,803 A | 10/2000 | Kelly et al. |
| 6,136,422 A | 10/2000 | Lichtenberg et al. |
| 6,149,769 A | 11/2000 | Mohammadi et al. |
| 6,159,339 A | 12/2000 | Hassler et al. |
| 6,162,327 A | 12/2000 | Batra et al. |
| 6,165,585 A | 12/2000 | Trokhan |
| 6,180,052 B1 | 1/2001 | Ouellette et al. |
| 6,180,214 B1 | 1/2001 | Nissing et al. |
| 6,182,290 B1 | 2/2001 | Morris |
| 6,187,141 B1 | 2/2001 | Takeuchi et al. |
| 6,187,695 B1 | 2/2001 | Krzysik et al. |
| 6,203,889 B1 | 3/2001 | Quincy, III et al. |
| 6,221,211 B1 | 4/2001 | Hollenberg et al. |
| 6,231,948 B1 | 5/2001 | Ouellette et al. |
| 6,232,521 B1 | 5/2001 | Bewick-Sonntag et al. |
| 6,238,519 B1 | 5/2001 | Jones et al. |
| 6,267,842 B1 | 7/2001 | Ona et al. |
| 6,270,875 B1 | 8/2001 | Nissing |
| 6,286,145 B1 | 9/2001 | Welchel et al. |
| 6,300,409 B2 | 10/2001 | Lau et al. |
| 6,328,850 B1 | 12/2001 | Phan et al. |
| 6,332,952 B1 | 12/2001 | Hsu et al. |
| 6,334,220 B1 | 1/2002 | Frye |
| 6,372,035 B1 | 4/2002 | Juppo et al. |
| 6,379,497 B1 | 4/2002 | Sandstrom |
| 6,383,960 B1 | 5/2002 | Everett et al. |
| 6,402,871 B1 | 6/2002 | Canary |
| 6,403,858 B1 | 6/2002 | Quincy et al. |
| 6,416,624 B1 | 7/2002 | Nielsen et al. |
| 6,416,628 B1 | 7/2002 | Huang et al. |
| 6,419,790 B1 | 7/2002 | Leege et al. |
| 6,427,240 B1 | 8/2002 | Royal |
| 6,436,234 B1 | 8/2002 | Chen et al. |
| 6,439,388 B1 | 8/2002 | Lerner et al. |
| 6,440,268 B1 | 8/2002 | Baggot et al. |
| 6,444,091 B1 | 9/2002 | Ward et al. |
| 6,454,693 B1 | 9/2002 | Harlacher et al. |
| 6,454,902 B1 | 9/2002 | Chen |
| 6,458,243 B1 | 10/2002 | Jones et al. |
| 6,464,829 B1 | 10/2002 | Chen et al. |

| Patent/Pub No. | Date | Inventor(s) |
|---|---|---|
| 6,478,927 B1 | 11/2002 | Chen et al. |
| 6,490,731 B1 | 12/2002 | Hyatt et al. |
| 6,494,990 B2 | 12/2002 | Bazaj et al. |
| 6,537,407 B1 | 3/2003 | Law et al. |
| 6,544,386 B1 | 4/2003 | Krzysik et al. |
| 6,548,427 B1 | 4/2003 | Shannon et al. |
| 6,551,691 B1 | 4/2003 | Hoeft et al. |
| 6,572,722 B1 | 6/2003 | Pratt |
| 6,573,203 B1 | 6/2003 | McConnell et al. |
| 6,576,049 B1 | 6/2003 | Dilts et al. |
| 6,585,859 B1 | 7/2003 | Hangkansson |
| 6,589,634 B2 | 7/2003 | Schulz et al. |
| 6,599,614 B1 | 7/2003 | Roussel et al. |
| 6,602,387 B1 | 8/2003 | Loughran et al. |
| 6,607,630 B2 | 8/2003 | Bartman et al. |
| 6,607,636 B2 | 8/2003 | Ross et al. |
| 6,616,806 B2 | 9/2003 | Chen |
| 6,635,134 B1 | 10/2003 | Lichtenberg et al. |
| 6,649,025 B2 | 11/2003 | Mills et al. |
| 6,656,596 B1 | 12/2003 | Gardner, Jr. |
| 6,666,952 B2 | 12/2003 | Dilts et al. |
| 6,673,983 B1 | 1/2004 | Graef |
| 6,713,140 B2 | 3/2004 | McCormack et al. |
| 6,716,312 B2 | 4/2004 | Kehrer et al. |
| 6,722,606 B2 | 4/2004 | Hanson et al. |
| 6,723,204 B2 | 4/2004 | Van Handel et al. |
| 6,727,004 B2 | 4/2004 | Goulet et al. |
| 6,733,608 B1 | 5/2004 | Baggot et al. |
| 6,733,866 B2 | 5/2004 | Muller |
| 6,746,558 B2 | 6/2004 | Hoeft et al. |
| 6,755,928 B1 | 6/2004 | Biagiotti |
| 6,755,938 B2 | 6/2004 | Kehrer et al. |
| 6,758,943 B2 | 7/2004 | McConnell et al. |
| 6,773,647 B2 | 8/2004 | McGuire et al. |
| 6,805,766 B1 | 10/2004 | Roussel et al. |
| 6,824,649 B2 | 11/2004 | Jewell et al. |
| 6,827,819 B2 | 12/2004 | Dwiggins et al. |
| 6,837,972 B2 | 1/2005 | Marsh |
| 6,863,107 B2 | 3/2005 | Hein et al. |
| 6,896,766 B2 | 5/2005 | Sarbo |
| 6,896,767 B2 | 5/2005 | Wilhelm |
| 6,911,573 B2 | 6/2005 | Chen |
| 6,913,673 B2 | 7/2005 | Baggot et al. |
| 6,916,403 B2 | 7/2005 | Basler et al. |
| 6,919,111 B2 | 7/2005 | Swoboda |
| 6,936,330 B2 | 8/2005 | Fereshtehkou et al. |
| 6,939,441 B2 | 9/2005 | Nurminen et al. |
| 6,949,167 B2 | 9/2005 | Shannon et al. |
| 6,964,725 B2 | 11/2005 | Shannon et al. |
| 6,964,726 B2 | 11/2005 | Chen et al. |
| 7,026,037 B2 | 4/2006 | Lefebvre Du Grosriez et al. |
| 7,029,546 B2 | 4/2006 | Basler et al. |
| 7,063,766 B2 | 6/2006 | Saarvali et al. |
| 7,125,469 B2 | 10/2006 | Barcut et al. |
| 7,214,633 B2 | 5/2007 | Sun et al. |
| 7,250,448 B2 | 7/2007 | Walchuk et al. |
| 7,282,273 B2 | 10/2007 | Murphy et al. |
| 7,300,547 B2 | 11/2007 | Luu et al. |
| 7,306,699 B2 | 12/2007 | Urlaub et al. |
| 7,381,299 B2 | 6/2008 | Shannon et al. |
| 7,449,085 B2 | 11/2008 | Hermans et al. |
| 7,497,923 B2 | 3/2009 | Ward et al. |
| 7,507,781 B2 | 3/2009 | Walchuk et al. |
| 7,662,257 B2 | 2/2010 | Edwards et al. |
| 7,666,272 B2 | 2/2010 | Williams et al. |
| 7,666,273 B2 | 2/2010 | Williams et al. |
| 7,794,566 B2 * | 9/2010 | Edwards et al. ............... 162/183 |
| 7,799,169 B2 * | 9/2010 | Bhat et al. .................... 162/125 |
| 2001/0009180 A1 | 7/2001 | Welch et al. |
| 2001/0051687 A1 | 12/2001 | Bazaj et al. |
| 2002/0060000 A1 | 5/2002 | Du Grosriez et al. |
| 2002/0088578 A1 | 7/2002 | Jones et al. |
| 2002/0096280 A1 | 7/2002 | Jones et al. |
| 2002/0096282 A1 | 7/2002 | Leibler et al. |
| 2002/0103469 A1 | 8/2002 | Chen et al. |
| 2002/0114933 A1 | 8/2002 | Gould |
| 2002/0170649 A1 | 11/2002 | Butterworth et al. |
| 2002/0195218 A1 | 12/2002 | Chen |
| 2003/0008109 A1 | 1/2003 | Basler et al. |
| 2003/0021952 A1 | 1/2003 | Zink et al. |
| 2003/0021953 A1 | 1/2003 | Graff |
| 2003/0026953 A1 | 2/2003 | Muller |
| 2003/0045844 A1 | 3/2003 | Taylor et al. |
| 2003/0056917 A1 | 3/2003 | Jimenez |
| 2003/0070782 A1 | 4/2003 | Proverb et al. |
| 2003/0075262 A1 | 4/2003 | Hein et al. |
| 2003/0075292 A1 | 4/2003 | Kehrer et al. |
| 2003/0111196 A1 | 6/2003 | Hu |
| 2003/0111198 A1 | 6/2003 | Hu |
| 2003/0116292 A1 | 6/2003 | Hollmark |
| 2003/0116294 A1 | 6/2003 | Kehrer et al. |
| 2003/0119397 A1 | 6/2003 | Von Paleske |
| 2003/0121628 A1 | 7/2003 | Mills et al. |
| 2003/0121629 A1 | 7/2003 | Hu |
| 2003/0121632 A1 | 7/2003 | Nurminen et al. |
| 2003/0121633 A1 | 7/2003 | Spence et al. |
| 2003/0127203 A1 | 7/2003 | Hu |
| 2003/0129363 A1 | 7/2003 | Hoeft et al. |
| 2003/0131960 A1 | 7/2003 | McConnell et al. |
| 2003/0152724 A1 | 8/2003 | Swoboda et al. |
| 2003/0188840 A1 | 10/2003 | Van Handel |
| 2003/0192664 A1 | 10/2003 | Kulick et al. |
| 2003/0201083 A1 | 10/2003 | Marsh |
| 2003/0203195 A1 | 10/2003 | Marsh |
| 2003/0205165 A1 | 11/2003 | Thornton et al. |
| 2003/0205167 A1 | 11/2003 | Dilts et al. |
| 2004/0003905 A1 | 1/2004 | Hilbig |
| 2004/0009327 A1 | 1/2004 | Saarvali et al. |
| 2004/0018369 A1 | 1/2004 | Goulet et al. |
| 2004/0020614 A1 | 2/2004 | Lindsey et al. |
| 2004/0038006 A1 | 2/2004 | Biagiotti |
| 2004/0044320 A1 | 3/2004 | Kainth et al. |
| 2004/0045685 A1 | 3/2004 | Horner et al. |
| 2004/0048542 A1 | 3/2004 | Thomaschefsky et al. |
| 2004/0055721 A1 | 3/2004 | Hilbig |
| 2004/0060664 A1 | 4/2004 | Lichtenberg et al. |
| 2004/0062916 A1 | 4/2004 | Mansson |
| 2004/0089433 A1 | 5/2004 | Propst et al. |
| 2004/0102528 A1 | 5/2004 | Walchuk et al. |
| 2004/0118532 A1 | 6/2004 | Sarbo et al. |
| 2004/0123963 A1 | 7/2004 | Chen et al. |
| 2004/0140047 A1 | 7/2004 | Sato et al. |
| 2004/0163783 A1 | 8/2004 | Muller |
| 2004/0163784 A1 | 8/2004 | Urlaub et al. |
| 2004/0166290 A1 | 8/2004 | Sembritzki et al. |
| 2004/0200590 A1 | 10/2004 | Wilhelm |
| 2004/0206274 A1 | 10/2004 | Kruckel |
| 2004/0206467 A1 | 10/2004 | Lindgren et al. |
| 2004/0221976 A1 | 11/2004 | Williams et al. |
| 2004/0250969 A1 | 12/2004 | Luu et al. |
| 2005/0034826 A1 | 2/2005 | Hu |
| 2005/0034828 A1 | 2/2005 | Graff et al. |
| 2005/0069679 A1 | 3/2005 | Stelljes et al. |
| 2005/0069680 A1 | 3/2005 | Stelljes et al. |
| 2005/0098281 A1 | 5/2005 | Schulz et al. |
| 2005/0098286 A1 | 5/2005 | Williams et al. |
| 2005/0103456 A1 * | 5/2005 | Hein et al. ............... 162/117 |
| 2005/0124704 A1 | 6/2005 | Rasheed et al. |
| 2005/0155731 A1 | 7/2005 | Martin et al. |
| 2005/0178515 A1 | 8/2005 | Ryan et al. |
| 2005/0224200 A1 | 10/2005 | Bouchard et al. |
| 2005/0230069 A1 | 10/2005 | Hilbig |
| 2005/0241788 A1 | 11/2005 | Baggot et al. |
| 2005/0247397 A1 | 11/2005 | Kraus et al. |
| 2005/0251098 A1 | 11/2005 | Wyss et al. |
| 2005/0257879 A1 | 11/2005 | Fisher et al. |
| 2005/0263234 A1 | 12/2005 | Shih |
| 2005/0274470 A1 | 12/2005 | Shannon et al. |
| 2005/0287340 A1 | 12/2005 | Morelli et al. |
| 2006/0005916 A1 | 1/2006 | Stelljes et al. |
| 2006/0013998 A1 | 1/2006 | Stelljes |
| 2006/0037512 A1 | 2/2006 | Pawlowska et al. |
| 2006/0042767 A1 | 3/2006 | Bhat et al. |
| 2006/0062972 A1 | 3/2006 | Lefebvre et al. |
| 2006/0070712 A1 | 4/2006 | Runge et al. |
| 2006/0144541 A1 | 7/2006 | Nickel et al. |
| 2006/0191656 A1 | 8/2006 | Buzza et al. |
| 2006/0269706 A1 | 11/2006 | Shannon et al. |

| | | | |
|---|---|---|---|
| 2006/0289136 A1 | 12/2006 | Doherty et al. | |
| 2006/0289137 A1 | 12/2006 | Gelman et al. | |
| 2008/0003384 A1 | 1/2008 | Murphy et al. | |
| 2008/0044644 A1 | 2/2008 | Luu et al. | |
| 2008/0156449 A1 | 7/2008 | Williams et al. | |
| 2008/0248284 A1 | 10/2008 | Williams et al. | |
| 2008/0265222 A1 | 10/2008 | Ozersky et al. | |
| 2009/0162611 A1 | 6/2009 | Ward et al. | |
| 2010/0212848 A1* | 8/2010 | Hilbig et al. | 162/109 |

FOREIGN PATENT DOCUMENTS

| | | |
|---|---|---|
| EP | 0 097 036 | 12/1983 |
| EP | 0144658 A1 | 6/1985 |
| EP | 0 476 976 | 3/1992 |
| EP | 1 103 522 | 5/2001 |
| EP | 1 632 604 | 3/2006 |
| GB | 1059746 | 2/1964 |
| GB | 2376436 A * | 12/2002 |
| GB | 2380447 A * | 4/2003 |
| JP | 2008/272267 | 11/2008 |
| WO | WO 98/02289 | 1/1998 |
| WO | WO 98/40207 | 9/1998 |
| WO | WO 00/00698 | 1/2000 |
| WO | WO 00/05065 | 2/2000 |
| WO | WO 01/12902 | 2/2001 |
| WO | WO 02/12622 | 2/2002 |
| WO | WO 2004/044320 | 5/2004 |
| WO | WO 2006/044117 | 4/2006 |
| WO | WO 2010/011646 | 1/2010 |

OTHER PUBLICATIONS

Office Action dated May 12, 2010, issued in co-pending U.S. Appl. No. 12/618,124.
Office Action dated Oct. 20, 2010, issued in co-pending U.S. Appl. No. 12/618,124.
English language machine translation of Japanese Patent Application No. 2008/272267, publication date Nov. 13, 2008.
C. O. Au and I. Thorn in "Applications of Wet-End Paper Chemistry", 1995, Blackie Academic & Professional an imprint of Chapman & Hall, First edition, pp. 102-119.
Office Action dated Feb. 17, 2011, issued in co-pending U.S. Appl. No. 12/618,124.

* cited by examiner

MULTI-PLY PAPER PRODUCT WITH MOISTURE STRIKE THROUGH RESISTANCE AND METHOD OF MAKING THE SAME

CLAIM TO PRIORITY

This application is a divisional of application Ser. No. 12/618,124, filed Nov. 13, 2009, which claims priority to application Ser. No. 10/995,457, filed Nov. 22, 2004, which claims priority under 35 U.S.C. §119(e) to U.S. Provisional Patent Application No. 60/606,674 entitled "MOISTURE BARRIER NAPKIN SUBSTRATE" dated Sep. 1, 2004, and to U.S. Provisional Patent Application 60/611,671 entitled "MULTI-PLY PAPER PRODUCT WITH MOISTURE STRIKE THROUGH RESISTANCE AND METHOD OF MAKING THE SAME" dated Sep. 20, 2004, all of which are incorporated herein by reference in their entireties.

SUMMARY OF THE INVENTION

This description is directed to a paper product with improved moisture strike through resistance. More particularly, a multi-ply paper product with improved strike through resistance is described, wherein at least one ply is a wetting resistant ply comprising at least one wetting resistant agent and at least one ply is an absorbent ply possessing greater absorbency than the wetting resistant ply. Even more particularly, a two-ply paper napkin with improved moisture strike through resistance is described, wherein the wetting resistant ply comprises alkyl ketene dimer and the two plies are separately microembossed and then glue laminated. This description is also directed to methods of making paper products with improved moisture strike through resistance.

Consumer paper products must meet many different demands for acceptance. Paper tissues are usually first regarded for their softness; paper towels and napkins are usually first regarded for their absorbency and durability. The paper products must also be attractive and possess good strength, while at the same time be recyclable and low-cost. In an effort to meet these divergent demands, paper products are often made from one or more paper plies that are joined together to form the finished product. Each of these plies may possess different characteristics to impart specific properties to the finished product, or the plies may all have the same properties that add up to form the finished product. Usually multi-ply products sacrifice expense and ease of manufacture in order to achieve one of the consumer attributes of softness, absorbency, durability, and strength. Many products require three or more plies to achieve one or more of these desired attributes.

Moisture strike through resistance may also be an important characteristic for consumer paper products. A paper product with moisture strike through resistance may provide benefits to the consumer, such as a paper napkin to protect the user's lap against spills of food or liquid. Other paper products, like coasters, doilies, and placemats, also benefit from moisture strike through resistance in an effort to protect the surface underneath. It is therefore desirous to create a paper product with both absorbency and moisture strike through resistance.

It has been surprisingly discovered that a multi-ply paper product with at least one wetting resistant ply and at least one absorbent ply allows the paper product to be light-weight, absorbent, durable, and possess strike through resistance. Because the paper product may be made from as few as two plies, the product may be light-weight and require significantly less paper and manufacturing time, both of which are good for the environment. Furthermore, when the product is produced with the at least one wetting resistant ply folded to the interior of the product, such as a napkin, the napkin exhibits absorbency, good hand feel, and increased moisture strike through resistance. The multi-ply paper product may be a consumer paper good, like a napkin, coaster, doily, placemat, towel, and tissue. The multi-ply paper product may also be called an absorbent paper product, which may also be a consumer paper good.

It has also been discovered that separately microembossing at least one of the two plies and glue laminating the plies in a point to point configuration increases the bulk and perceived softness of the product. Subsequently, macroembossing the joined product increased its attractiveness, and all the while the product maintained its moisture strike through resistance and absorbency.

DESCRIPTION OF THE EMBODIMENTS

Figure 1:
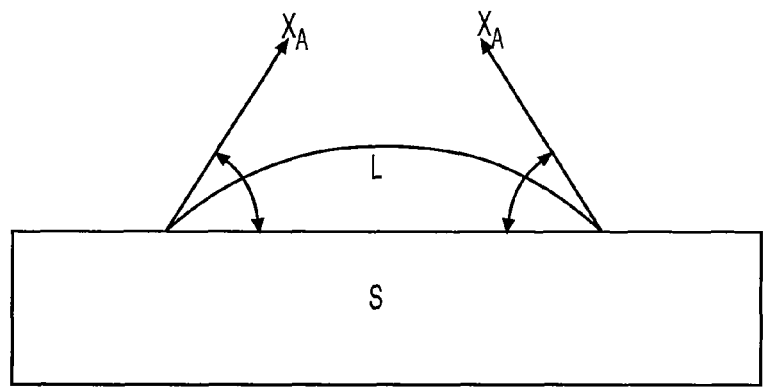
FIG. 1 is a drawing showing the contact angle θ of a liquid droplet on a solid surface.

It is to be understood that both the foregoing general description and the following detailed description are exemplary and explanatory only and are not restrictive of the invention, as claimed. Combinations and variants of the individual embodiments discussed are both fully envisioned and intended. Although the foregoing general description and the following detailed description may generally discuss a paper napkin, a napkin is not intended to be the only form of paper product envisioned under the present description. Additional paper products that may be created according to the present description include consumer disposable paper goods such as towels, padding, coasters, doilies, place mats, table coverings, and tissues. As used herein, "at least one" means one or more.

The accompanying drawings, which are incorporated in and constitute a part of this specification, illustrate several embodiments of the invention and, together with the description, serve to explain the principles of the invention.

According to one embodiment, a paper product is produced from at least two plies, the first of which comprises at least one wetting resistant compound (hereinafter called "wetting resistant ply") and the second of which possesses greater absorbency than the first ply (hereinafter called "absorbent ply"). According to another embodiment, a paper product is produced from at least two plies, the first of which comprises at least one hydrophobe (hereinafter called "hydrophobic ply") and the second of which possesses greater absorbency than the hydrophobic ply (also called "absorbent ply"). In one embodiment, the paper product may possess improved strike through resistance when compared to paper products without at least one wetting resistant ply. In another embodiment, the two plies are joined together by a technique that does not provide paths allowing penetration of moisture though the composite structure, such as glue lamination with or without point-to-point embossing. In a further embodiment, the at least one absorbent ply may be microembossed. In yet another embodiment, the at least one absorbent ply and the at least one wetting resistant ply may be separately microembossed.

The term "ply," as used herein, refers to a monolithic or stratified fibrous structure that is integrally formed on a papermaking machine. The paper plies may be manufactured on any type of papermaking machine. In general, the production of paper plies and products occurs by one of three methods: (1) conventional wet press (CWP) with wet creping and embossing, as described in U.S. Pat. No. 5,048,589 (incorporated herein by reference in its entirety); (2) CWP with dry creping and embossing, as described in U.S. Pat. No. 5,048,589 (incorporated herein by reference in its entirety); and (3) through-air-drying (TAD) with or without creping, as described in U.S. Pat. Nos. 3,301,746 and 3,905,863 (both incorporated herein by reference in their entireties).

Paper plies are generally manufactured by suspending cellulosic fibers in an aqueous medium to form a web and then removing most of the liquid. The resulting paper derives some of its structural integrity from the geometric and mechanical arrangement of the cellulosic fibers in the web; however, most of the paper's strength is derived from hydrogen bonding that links the cellulosic fibers to one another. The degree of strength imparted by this inter-fiber bonding, while necessary to the utility of the product, may result in a lack of perceived softness that is inimical to consumer acceptance.

One method of increasing the perceived softness of a paper product is to crepe the paper. Creping may occur by affixing the cellulosic web to a Yankee dryer with an adhesive or adhesive/release agent combination and then scraping the web off the Yankee with a creping blade. By breaking a significant number of inter-fiber bonds, creping adds to and increases the perceived softness of the paper product. Creping, Yankee dryers, adhesive agents, release agents, and creping blades are described in more detail in U.S. Pat. Nos. 5,961,782, 6,207,011, and 6,663,942, each of which is incorporated herein by reference in their entireties.

Another method of increasing the perceived softness of a paper product is to add chemical softening and debonding agents. The agents may be either added to the wet end of the papermaking process, sprayed on the paper web after it is formed but before it is dried, sprayed on the paper web after it is formed and after it is dried, or combinations of these. However, it should be noted that the degree of increased perceived softness is generally lessened by spraying versus wet end addition.

Papermaking fibers used to form the paper products described herein include cellulosic fibers commonly referred to as wood pulp fibers, which may be liberated in a pulping process from either or both of softwood (gymnosperm or coniferous) trees or hardwood (angiosperm or deciduous) trees. In one embodiment, the papermaking fibers comprise a mixture of hardwood kraft and softwood kraft fibers. The particular type of tree or trees and pulping process used to produce fibers are not critical to the success of the paper products described herein. Cellulosic fibers that may be used also include non-woody fibers such as those from sabai grass, rice straw, banana leaves, paper mulberry (i.e., bast fiber), abaca leaves, pineapple leaves, esparto grass leaves, and the genus hesperalae in the family agavaceae. Further, artificial or synthetic fibers may be used in varying percentages, including, but not limited to, glass fiber, nylon fiber, acrylic fiber, polyester fiber, rayon fiber, polystyrene fiber, carbon fiber, and polyacrylamide fiber. In addition, recycled fibers from a hardwood, softwood, non-woody sources, and/or artificial or synthetic fibers may also be used in varying percentages.

The papermaking fibers may be liberated from their source material by any one of a number of chemical pulping processes known to one of ordinary skill, including, but not limited to, sulfate, sulfite, polysulfite, and soda pulping. In addition, the pulp may be bleached by chemical means including, but not limited to, chlorine, chlorine dioxide, and oxygen.

The papermaking fibers may also be liberated from their source material by any one of a number of chemical/mechanical pulping processes know to one of ordinary skill, including, but not limited to, mechanical pulping, thermomechanical pulping, and chemithermomechanical pulping. In addition, the pulp may be bleached by chemical means including, but not limited to, alkaline peroxide and ozone bleaching.

The paper product as described herein comprises at least one ply comprising at least one wetting resistant compound. A wetting resistant compound is a substance that will bond to cellulose and also repel a liquid or liquids. The cellulosic bond may be either electrostatic or covalent or both. In one embodiment, the at least one wetting resistant compound is an oleophobe and the ply may be called an oleophobic ply. An oleophobe is a compound or composition that will bond to cellulose but also repels oil, i.e., has a polar portion. In another embodiment, the at least one wetting resistant compound is a hydrophobe and the ply may be called a hydrophobic ply. A hydrophobe is a compound or composition that will bond to cellulose but also repels water, i.e., has a non-polar portion. A oleophobe or hydrophobe may also be a compound or composition that increases the initial contact angle of the paper ply to which it is added. A hydrophobe may also be a compound or a composition that repels or resists contact with any aqueous liquid, for example including, but not limited to, wine, beer, and water/oil emulsions. In another embodiment, the at least one wetting compound is one compound with multiple properties (i.e., both oleophobic and hydrophobic). In a further embodiment, the at least one wetting compound may be a mixture or multiple compounds each possessing unitary (i.e., oleophobic or hydrophobic) or multiple properties. A ply containing an at least one wetting compound of the latter two embodiments may be called a hydrophobic ply, an oleophobic ply, or both, in addition to a wetting resistant ply. In yet another embodiment, the paper product described herein comprises at least one ply comprising at least two wetting resistant compounds, wherein one is a hydrophobe and the other is an oleophobe. Such a ply may be called a hydrophobic ply, an oleophobic ply, or both, in addition to a wetting resistant ply.

Although the foregoing and following descriptions may generally discuss at least one hydrophobe and/or at least one hydrophobic ply, a hydrophobe is not intended to be the only or sole form of wetting resistant compound envisioned under the present description.

Wetting resistant compounds suitable for use include, but are not limited to, reactive sizing agents (such as alkenyl ketene dimer (ALKD), alkyl ketene dimer (AKD), and alkenyl succinic anhydride (ASA)), fluorochemicals, silicones, hydrophobically modified anionic polymer (HMAP), hydrophobically modified cationic polymer (HMCP), ethylene-acrylic acid (EAA), neutral rosin emulsions, and conventional paper sizing agents. The wetting resistant compounds listed above may repel water such that they may be called hydrophobes. As used herein, a reactive sizing agent is a wetting resistant compound that may form at least one covalent bond with cellulosic fiber. In one embodiment, the at least one wetting resistant compound is an ASA emulsion. In another embodiment, the at least one wetting resistant compound is AKD, such as NovaSize® AKD 3016 made by Georgia-Pacific Corp. In a further embodiment, the at least one wetting resistant compound is ALKD. In some embodiments, the at least one wetting resistant compound may form different chemical species and/or may become chemically bound to the paper fibers as discussed in "A New Method for the Analysis of AKD Oligomers in Papermaking Systems" (Nordic Pulp and Paper Research Journal, Vol. 17, March 2002). As discussed in that paper, AKD may react with cellulose to give bound AKD; in addition, AKD may react with water to form dialkyl ketones or may react with itself to form oligomers.

Additional wetting resistant compounds suitable for use include, but are not limited to, fluorochemicals. In one embodiment, the fluorochemical is a polymeric fluoro compound, such as perfluorinated polyacrylates and perfluorinated polyurethanes. In another embodiment, the fluorochemical is a relatively small molecule, such as a linear perfluoropolyethers (PFPEs) and molecules possessing single or twin perfluorinated chains, and may be in the form of carboxylate and phosphate salts, including amphoteric and ammonium salt derivatives of these. In a further embodiment, the fluorochemical comprises a perfluoroalkyl chain or chains attached to a polar functional group. In yet another embodiment, the fluorochemical is polytetrafluoroethylene, such as, for example, TEFLON® sold by the DuPont Company of Wilmington, Del. In yet a further embodiment, the fluorochemical is a perfluoroalkyl substituted carboxylic acid, such as, for example, Ciba® LODYNE® 2000 sold by Ciba Specialty Chemicals of Tarrytown, N.Y. Fluorochemicals may exhibit oleophobic properties, hydrophobic properties, or both oleophobic and hydrophobic properties. In one embodiment, the fluorochemical is an oleophobe. In another embodiment, the fluorochemical is both an oleophobe and a hydrophobe. In yet another embodiment, the fluorochemical is a hydrophobe.

The pH of the papermaking system used to produce the at least one wetting resistant ply may influence the choice of and the retention of the at least one wetting resistant compound. In one embodiment, the at least one wetting resistant compound is a hydrophobe in the form of a neutral rosin at an acidic pH. In another embodiment, the at least one wetting resistant compound is a hydrophobe in the form of ASA at a slightly acidic to alkaline pH. In a further embodiment, the least one wetting resistant compounds is a hydrophobe in the form of AKD at about a neutral to an alkaline pH. Appropriate wetting resistant compounds for use a different pH levels will be readily apparent to the skilled artisan. Moreover, appropriate pH levels for use with different wetting resistant compounds will also be readily apparent to the skilled artisan.

The at least one wetting resistant compound may be present in an amount ranging from about 2 to about 12 pounds per ton. In general, larger amounts of the at least one wetting resistant compound are used in a furnish with a higher amount of fiber fines and other anionic trash; cleaner furnish generally requires lesser amounts of the at least one wetting resistant compound. For example, the at least one wetting resistant compound may be present in about 2 to about 3 pounds per ton of very clean furnish. As another example, the at least one wetting resistant compound may be present in about 3 to about 4 pounds per ton of clean furnish. As a further example, the at least one wetting resistant compound may be present in about 8 to about 10 pounds per ton of dirty furnish or furnish containing greater than 50% of recycled fibers.

The at least one wetting resistant compound is generally added to the wetting resistant ply as a dilute solution of solids. In one embodiment, the at least one wetting resistant compound is added as a solution of about 1% solids. In another embodiment, the at least one wetting resistant compound is added as a solution of about 2% solids.

The at least one wetting resistant compound may impart increased release properties to the wetting resistant ply. When the at least one wetting resistant compound acts as a release agent, release agent flow on a Yankee may be decreased or set to zero. At the same time, adhesion agent flow on a Yankee may be maintained or increased to compensate for the increased release properties of the at least one wetting resistant agent. In embodiments where higher amounts of the at least one wetting resistant compound are used to compensate for a dirty furnish, little or no release agent will be included on the Yankee while adhesion agent flow may be increased.

The at least one wetting resistant compound may also possess an increased charge density. As used herein, a wetting resistant compound with an increased charge density is called a promoted wetting resistant compound. A promoted wetting resistant compound may facilitate bonds with anionic or cationic species in the paper furnish. In one embodiment, a promoted wetting resistant compound has an increased negative charge density such that it is substantially anionic. A promoted wetting resistant compound may be produced by any process that attaches to the wetting resistant compound a substituent group or groups with substantial cationic or anionic nature.

The at least one wetting resistant compound may be prepared or stabilized by emulsifying the at least one wetting resistant compound with water and/or starch. In one embodiment, an at least one hydrophobe is prepared by emulsifying AKD with water. In another embodiment, an at least one hydrophobe is prepared by emulsifying AKD with starch in water. In a further embodiment, an at least one hydrophobe is prepared by emulsifying ASA with water. In yet another embodiment, an at least one hydrophobe is prepared by emulsifying ASA with starch in water. Each of the foregoing embodiments also contemplate the preparation of at least one hydrophobe by emulsifying promoted AKD or ASA with water and/or starch.

The at least one wetting resistant compound may be introduced to the ply comprising at least one wetting resistant compound at many or multiple points during the papermaking process. Moreover, different at least one wetting resistant compounds may be introduced to the ply at the same or different points during the papermaking process. Furthermore, different at least one wetting resistant compounds may be introduced to the ply at many or multiple points during the papermaking process. Multiple points of the papermaking process may facilitate the addition of at least one hydrophobe and at least one oleophobe to the wetting resistant ply. Degree of coverage and/or uniformity of the at least one wetting resistant compound on or throughout the wetting resistant ply may influence the point(s) of introduction, as well as the speed of the papermaking process.

In one embodiment, the at least one wetting resistant compound is added to the stuffbox. In another embodiment, the at least one wetting resistant compound is added to the suction side of the machine chest pump. In a further embodiment, the at least one wetting resistant compound is sprayed onto the ply before the suction pressure roll. In yet another embodiment, the at least one wetting resistant compound is sprayed onto the ply before the Yankee hood. In yet a further embodiment, the least one wetting resistant compound is added either to the stuff box or the suction side of the machine chest pump, and sprayed onto the ply either before the suction pressure roll or before the Yankee hood. In another embodiment, the at least one wetting resistant compound is sprayed onto the ply after the Yankee hood. In a further embodiment, the at least one wetting resistant compound is added to the suction side of the machine chest pump and sprayed onto the ply after the Yankee hood. Of course, each of the above embodiments apply when the at least one wetting resistant compound is an hydrophobe, an oleophobe, or when both hydrophobes and oleophobes are used.

The wetting resistant ply described herein may also comprise at least one retention aid. A retention aid is a compound that tends to improve the retention of cellulosic fiber fines and/or the at least one wetting resistant compound in the wetting resistant ply, rather than allow the fiber fines to pass through the forming wire. In one embodiment, the retention aid operates by neutralizing anionic trash and fines present in a paper furnish. The retention aid of the latter embodiment may neutralize anionic trash through a cationic charge preventing an attraction between the trash and the at least one wetting resistant compound. In another embodiment, the retention aid operates by creating or facilitating an attraction or bond between the fibers of the paper furnish and the at least one wetting resistant compound. The retention aid of the latter embodiment may facilitate such an attraction or bond through a combination of high molecular weight, such that it becomes trapped in the paper furnish and retained in the paper web as it is being formed, and of cationic nature, such that it attracts any anionic trash to which the at least one wetting resistant compound may also have been attracted. In a further embodiment, the retention aid operates both by neutralizing anionic trash and by facilitating an attraction between the paper fibers and the at least one wetting resistant compound.

The retention aid may be introduced in a number of places during the papermaking process. In one embodiment, the at least one retention aid is introduced to the wetting resistant ply by its addition to the suction side of the machine chest pump at the wet end of the papermaking process, either before or after the addition of the at least one wetting resistant compound. In another embodiment, the at least one retention aid is introduced to the wetting resistant ply after the fan pump, either before or after the addition of the at least one wetting resistant compound.

Retention aids suitable for use include, but are not limited to, polyamines, acrylamides, diallyl dimethyl ammonium chloride (DADMAC), polyethylenimines, and cationic coagulants. In one embodiment, the retention aid is a cationic coagulant, such as Bufloc® 5031 sold by Buckman Laboratories, Inc., of Memphis, Tenn. In another embodiment, the retention aid is a cationic polyacrylamide, such as Bufloc® 2149 sold by Buckman Laboratories, Inc.

The at least one retention aid may be added in an amount ranging from 0 to about 12 pounds per ton of fiber. In one embodiment, the at least one retention aid is added in an amount of about 1 to about 3 pounds per ton of fiber. In another embodiment, the at least one retention aid is added in an amount of about 2 pounds per tons of fiber. In a further embodiment, the at least one retention aid is added in an amount of about 5 to about 7 pounds per ton of fiber. In yet another embodiment, the at least one retention aid is added in an amount of about 6 pounds per ton of fiber. In yet a further embodiment, the at least one retention aid is added in an amount of about 10 pounds per ton of fiber.

The paper product described herein also comprises at least one absorbent ply. The absorbent ply possesses greater absorbency than the wetting resistant ply. In one embodiment, the at least one absorbent ply is made from the same composition as the at least one wetting resistant ply but contains a decreased amount of the at least one wetting resistant compound. In another embodiment, the at least one absorbent ply is made from the same composition as the at least one wetting resistant ply but contains a decreased amount of the at least one wetting resistant compound and an increased amount of any at least one wet strength additive. In a further embodiment, the at least one absorbent ply is made from the same composition as the at least one wetting resistant ply but contains none of the at least one wetting resistant compound. In yet another embodiment, the at least one absorbent ply is made from the same composition as the at least one wetting resistant ply but contains none of the at least one wetting resistant compound and an increased amount of any at least one wet strength additive.

One or more of the paper plies may comprise at least one wet strength additive. When at least one wet strength additive is included in the at least one wetting resistant ply, the additive is introduced to the at least one wetting resistant ply by its addition to the suction side of the machine chest pump at the wet end of the papermaking process, either before or after the addition of the at least one wetting resistant compound. Wet strength additives suitable for use include, but are not limited to, aliphatic and aromatic aldehydes, urea-formaldehyde resins, melamine formaldehyde resins, and polyamide-epichlorohydrin resins.

In one embodiment, the at least one wet strength additive is a polyamide-epichlorohydrin (PAE) resin. One example of these resins is AMRES® 15 HP sold by Georgia-Pacific Corp. Two additional examples of these resins are Kymene® 557LX and Kymene® 557H sold by Hercules Inc. of Wilmington, Del. Such resins and the process of making the resins are described in U.S. Pat. Nos. 3,700,623 and 3,772,076, both of which are incorporated herein by reference in their entireties. Additional description of polyamide-epichlorohydrin resins is given in Espy, "Chapter 2: Alkaline-Curing Polymeric Amine-Epichlorohydrin Resins," *Wet Strength Resins and Their Application* (L. Chan, ed., 1994). Further description and examples of polyamide-epichlorohydrin resins is given in Westfelt, *Cellulose Chemistry and Technology*, Vol. 13, p. 813 (1979).

In another embodiment, the at least one wet strength additive is a temporary wet strength agent. Useful temporary wet strength agents include, but are not limited to, aliphatic and aromatic aldehydes including glyoxal, malonic dialdehyde, succinic dialdehyde, glutaraldehyde and dialdehyde starches, as well as substituted or reacted starches, disaccharides, polysaccharides, chitosan, or reacted polymeric reaction products of monomers or polymers having aldehyde groups, and optionally, amine groups. Representative nitrogen containing polymers, which can suitably be reacted with the aldehyde containing monomers or polymers, include vinylamides, acrylamides, and related nitrogen containing polymers. These polymers impart a positive charge to the aldehyde containing reaction product. In addition, other commercially available temporary wet strength agents, such as, PAREZ® 745, manufactured by Lanxess of Pittsburgh, Pa., can be used, along with those disclosed, for example, in U.S. Pat. No. 4,605,702, which is incorporated herein by reference in its entirety.

The temporary wet strength resin may be any one of a variety of water-soluble organic polymers comprising aldehydic units and cationic units used to increase dry and wet tensile strength of a paper product. Such resins are described in U.S. Pat. Nos. 4,675,394; 5,240,562; 5,138,002; 5,085,736; 4,981,557; 5,008,344; 4,603,176; 4,983,748; 4,866,151; 4,804,769; and 5,217,576, each of which is incorporated herein by reference in its entirety. Modified starches sold under the trademarks CO-BOND® 1000 and CO-BOND® 1000 Plus, by National Starch and Chemical Company of Bridgewater, N.J., may also be used. Prior to use, a cationic aldehydic water soluble polymer may be prepared by preheating an aqueous slurry of approximately 5% solids maintained at a temperature of approximately 240° F. and a pH of about 2.7 for approximately 3.5 minutes. The slurry can be then quenched and diluted by adding water to produce a mixture of approximately 1.0% solids at less than about 130° F.

Other temporary wet strength agents, also available from National Starch and Chemical Company are sold under the trademarks CO-BOND® 1600 and CO-BOND® 2300. These starches are supplied as aqueous colloidal dispersions and do not require preheating prior to use.

Temporary wet strength agents such as glyoxylated polyacrylamide can be used. Temporary wet strength agents such as glyoxylated polyacrylamide resins are produced by reacting acrylamide with diallyl dimethyl ammonium chloride (DADMAC) to produce a cationic polyacrylamide copolymer which is ultimately reacted with glyoxal to produce a cationic cross-linking temporary or semi-permanent wet strength resin, glyoxylated polyacrylamide. These materials are generally described in U.S. Pat. No. 3,556,932 to Coscia et al. and U.S. Pat. No. 3,556,933 to Williams et al., both of which are incorporated herein by reference in their entireties. Resins of this type are commercially available under the trade name of PAREZ® 631 NC, by Lanxess of Pittsburgh, Pa. Different mole ratios of acrylamide/DADMAC/glyoxal can be used to produce cross-linking resins, which are useful as wet strength agents. Furthermore, other dialdehydes can be substituted for glyoxal to produce wet strength characteristics. According to one embodiment, the pulp contains up to about 30 lbs/ton of temporary wet strength agent. According to another embodiment, the pulp contains from about 0 to about 10 lbs/ton of a temporary wet strength agent.

The at least one wet strength additive may be present in an amount ranging from 0 to about 30 pounds per ton. In one embodiment, about 1 pound of the at least one wet strength additive is added per ton of fiber. In another embodiment, about 2 pounds of the at least one wet strength additive are added per ton of fiber. In a further embodiment, about 4 pounds of the least one wet strength additive are added per ton of fiber. In yet another embodiment, about 10 pounds of the at least one wet strength additive are added per ton of fiber. In yet a further embodiment, about 20.5 pounds of the at least one wet strength additive are added per ton of fiber. In some embodiments, the at least one wet strength additive may affect the amount of retention of the at least one wetting resistant compound on the paper fibers. In one such embodiment, about 1 to about 2 pounds of the at least one wet strength additive are added per ton of fiber.

One or more of the paper plies may include a dry strength agent. Useful dry strength agents include, but are not limited to, starch, guar gum, polyacrylamides, and carboxymethyl cellulose. According to one embodiment, the dry strength agent is carboxymethyl cellulose, an example of which is sold under the trade name HERCULES CMC, by Hercules Inc. of Wilmington, Del. According to another embodiment, the pulp contains from about 0 to about 15 lbs/ton of dry strength agent. According to yet another embodiment, the pulp contains from about 1 to about 5 lbs/ton of dry strength agent.

One or more of the paper plies may include a debonder and/or softener. These debonders and softeners may be incorporated into the pulp or sprayed upon the web after its formation. According to one embodiment, softening and debonding agents are added in an amount of not greater than about 2% by weight. According to another embodiment, softening and debonding agents are added in amount of not greater than about 1% by weight. According to yet another embodiment, softening and debonding agents are added in an amount of greater than about 0% but less than about 0.4% by weight.

According to one embodiment, the softener material is an imidazoline derived from partially acid neutralized amines. Such materials are disclosed in U.S. Pat. No. 4,720,383, which is incorporated herein by reference in its entirety. Also relevant are the following articles: Evans, Chemistry and Industry, 5 Jul. 1969, pp. 893-903; Egan, J. Am. Oil Chemist's Soc., Vol. 55 (1978), pp. 118-121; and Trivedi et al., J. Am. Oil Chemist's Soc., June 1981, pp. 754-756.

Softeners are often available commercially as complex mixtures rather than as single compounds. While this discussion will focus on the predominant species, it should be understood that commercially available mixtures could generally be used.

HERCULES 632, sold by Hercules, Inc. of Wilmington, Del., is a suitable softener material, which may be derived by alkylating a condensation product of oleic acid and diethylenetriamine. Synthesis conditions using a deficiency of alkylation agent (e.g., diethyl sulfate) and only one alkylating step, followed by pH adjustment to protonate the non-ethylated species, result in a mixture consisting of cationic ethylated and cationic non-ethylated species. Since only a minor proportion (e.g., about 10%) of the resulting amino or amidol salt cyclize to imidazoline compounds, the major portion of these chemicals are pH sensitive.

Quaternary ammonium compounds, such as dialkyl dimethyl quaternary ammonium salts are also suitable, particularly when the alkyl groups contain from about 14 to about 20 carbon atoms. These compounds have the advantage of being relatively insensitive to pH.

The paper plies may also comprise a class of cationic softeners comprising imidazolines, which have a melting point of about 0° C. to about 40° C. when formulated with aliphatic polyols, aliphatic diols, alkoxylated aliphatic diols, alkoxylated polyols, alkoxylated fatty acid esters, or a mixture of these compounds. The softener may comprise an imidazoline moiety formulated in aliphatic polyols, aliphatic diols, alkoxylated aliphatic diols, alkoxylated aliphatic polyols, alkoxylated fatty acid esters, or a mixture of these compounds is dispersible in water at a temperature of about 1° C. to about 40° C.

The organic compound component of the softener, other than the imidazoline, may be selected from aliphatic diols, alkoxylated aliphatic diols, aliphatic polyols, alkoxylated aliphatic polyols, alkoxylated fatty esters, esters of polyethylene oxides, or a mixture of these compounds having a weight average molecular weight of from about 60 to about 1500. The cold-water dispersed aliphatic diols may have a molecular weight of about 90 to about 150. According to another embodiment, the molecular weight of from about 120 to about 150. According to one embodiment, the diol is 2,2,4 trimethyl 1,3 pentane diol (TMPD) and the alkoxylated diol is ethoxylated 2,2,4 trimethyl 1,3 pentane diol (TMPD/EO). Suitably, the alkoxylated diol is TMPD (EO)$_n$ wherein n is an integer from 1 to 7, inclusive. Dispersants for the imidazoline moiety are alkoxylated aliphatic diols and alkoxylated polyols. Since it is hard to obtain pure alkoxylated diols and alkoxylated polyols, mixtures of diols, polyols, and alkoxylated diols, and alkoxylated polyols, and mixtures of only diols and polyols can be suitably utilized. A suitable imidazoline softener is sold by Hercules, Inc. of Wilmington, Del., under the trade name PROSOFT 230.

Biodegradable softeners can also be utilized. Representative biodegradable cationic softeners/debonders are disclosed in U.S. Pat. Nos. 5,312,522; 5,415,737; 5,262,007; 5,264,082; and 5,223,096, herein incorporated by reference in their entireties. These compounds are biodegradable diesters of quaternary ammonia compounds, quaternized amine-esters, biodegradable vegetable oil based esters functionalized with quaternary ammonium chloride, and diester dierucyldimethyl ammonium chloride are representative biodegradable softeners.

One or more of the paper plies may include at least one particulate filler. Useful particulate fillers include, but are not limited to, clay, calcium carbonate, titanium dioxide, talc, aluminum silicate, silica, calcium silicate, calcium sulfate, as well as the "ash" normally occurring in recycled fibers.

One or more of the paper plies may include at least one other additive, including, but not limited to, sizing agents, absorbency aids, opacifiers, brighteners, optical whiteners, dyes, colorants, or starches.

The paper plies described herein may be manufactured according to any of the papermaking methods previously discussed and others known to one of ordinary skill or later developed. In one embodiment, at least one paper ply is made by CWP. In another embodiment, at least one paper ply is made by TAD. In another embodiment, at least one paper ply is made by a process that produces a ply with a relatively uniform pore structure. In a further embodiment, at least one paper ply is made by a process that produces a ply with a relatively uniform structure of relatively small pores.

After the at least one wetting resistant ply and the at least one absorbent ply have been produced, they are often reeled to await further processing to the finished paper product. The further processing is generally referred to as converting. While converting operations are generally carried out on reeled paper plies, a converting operation may also be added directly to the end of a papermaking process or processes. Converting includes, but is not limited to, operations such as calendering, embossing, plying, the application of treatment agents, heat treating, slitting, and folding. The paper product may be subjected to any of the recognized converting operations that are readily apparent to the skilled artisan.

Either or both of the at least one absorbent ply and the at least one wetting resistant ply may be calendered. In one embodiment, both the at least one absorbent ply and the at least one wetting resistant ply are separately calendered. In another embodiment, both the at least one absorbent ply and the at least one wetting resistant ply are separately calendered to possess a TMI friction value of at about 0.27 to about 0.59 In a further embodiment, the either or both of the at least one absorbent ply and the at least one wetting resistant ply possess a TMI friction value of about 0.43. TMI friction and tests for TMI friction are discussed and described in U.S. Patent Application Publication No. 2004/0168780, which is incorporated herein by reference in its entirety.

The caliper of the paper plies or products of the present description may be measured, for example, by using a Model 89-I JR, 89-II JR, or Progage Electronic Thickness Tester available from the Thwing-Albert Instrument Company of Philadelphia, Pa. In one embodiment, the caliper is measured with a Model 89-II Tester on a sample consisting of a stack of eight sheets of plies using a two-inch diameter anvil at a 539+−10 gram dead weight load with a 0.231 in/sec descent rate. In another embodiment, the caliper is measured with a Model 89-II Tester on a sample consisting of a stack of eight completely unfold napkins made in accordance with the present description using a two-inch diameter anvil at a 539±10 gram dead weight load with a 0.231 in/sec descent rate.

Embossing is the act of mechanically working a substrate to cause the substrate to conform under pressure to the depths and contours of a patterned embossing roll. In general, the paper web or ply is passed between a pair of emboss rolls that, under pressure, form contours within the surface of the web or ply. In most embossing configurations, at least one of the two roller surfaces directly carriers the patterns to be transferred to the paper web or ply. Known configurations of this type include rigid-to-resilient and rigid-to-rigid embossing.

In a rigid-to-resilient embossing system, a single or multi-ply substrate is passed through a nip formed between a first roll, the substantially rigid surface of which contains the embossing pattern as a multiplicity of protuberances and/or depressions arranged into an aesthetically pleasing manner, and a second roll, the substantially resilient surface of which may either be smooth or also contain a multiplicity of protuberances and/or depressions that cooperate with the rigid surfaced patterned roll.

Rigid rolls generally comprise either a steel body that is directly engraved or a hard rubber coated surface (either directly coated or sleeved) that is laser engraved. While a directly engraved steel roll has a longer lifespan, its production may require significant lead time. Laser engraved sleeved rolls may require less production lead time, but often have a lifespan substantially less than that of a steel roll.

Resilient rolls may comprise a steel core directly coated or sleeved with a resilient material and may or may not be engraved with a pattern. If a pattern is present, the pattern may be either a mated, matched-mated, or a non-mated pattern with respect to the pattern carried on the rigid roll.

In a rigid-to-rigid embossing system, a single-ply or multi-ply substrate is passed through a nip formed between two substantially rigid rolls. The surfaces of both rolls contain the pattern to be embossed as a multiplicity of protuberances and/or depressions arranged into an aesthetically pleasing manner. The protuberance and/or depressions of the second roll cooperate with those patterned in the first rigid roll. The first rigid roll is generally comprises either a steel body that is directly engraved or a hard rubber coated surface (either directly coated or sleeved) that is laser engraved. The second rigid roll generally comprises a steel body that is directly engraved or a hard rubber covered surface (either directly coated or sleeved) possessing a matching or mated pattern that is either conventionally engraved or laser engraved.

The paper product may be embossed using any art recognized or after-developed embossing pattern. The embossing process may be used not only to increase bulk and absorbance, but also to ply the product. Embossing may also be used to improve the aesthetic appearance of the paper product. In one embodiment, the paper products are embossed according to U.S. Pat. No. 5,415,918, the disclosure of which is incorporated herein by reference in its entirety.

The paper plies of the paper product may be microembossed. Microembossing is an embossing process that comprises embossing a paper ply using emboss elements of less than about 1 millimeter in size. Microembossing is generally used to impart bulk to a paper ply, although it may also be used to impart an aesthetic design. In one embodiment, a microembossed ply possesses about 40 to about 60 dots per square centimeter.

Either or both of the at least one absorbent ply and the at least one wetting resistant ply may be microembossed. In one embodiment, both the at least one absorbent ply and the at least one wetting resistant ply are separately microembossed. In another embodiment, the at least one absorbent ply is microembossed and the at least one wetting resistant ply is not microembossed. In a further embodiment, the at least one absorbent ply is not microembossed and the at least one wetting resistant ply is microembossed. In yet another embodiment, the at least one absorbent ply is microembossed and comprises at least one wet strength agent in a greater amount than the at least one wetting resistant ply. In yet a further embodiment, both the at least one absorbent ply and the at least one wetting resistant ply are separately microembossed and the at least one absorbent ply comprises at least one wet strength agent in a greater amount than the at least one wetting resistant ply. In another embodiment, the at least one wetting resistant ply is not embossed and the at least one absorbent ply is microembossed and comprises at least one wet strength agent in a greater amount than the at least one wetting resistant ply.

The paper plies of the paper product may be macroembossed. Macroembossing is an embossing process that comprises embossing a paper ply using emboss elements of greater than about 1 millimeter in size. Macroembossing is generally used to impart an aesthetic design to a paper ply, although it may also be used for plying and/or to increase bulk. The paper product may comprise plies that have been separately embossed before plying or embossed as a whole after plying or both. In one embodiment, the at least one wetting resistant ply and the at least one absorbent ply are separately microembossed before plying, and then macroembossed at the same time after plying. U.S. Patent Application Publication No. 2004/0168780, which is incorporated herein by reference in its entirety, describes embossing processes that include one or both of microembossing and macroembossing.

The paper plies may also be coin edged. Coin edging is generally used for plying the edges of a multi-ply paper product, although it may also be used to impart an aesthetic design and/or to increase bulk. In one embodiment, the at least one hydrophobic ply and the least one wetting resistant ply are coin edged. In another embodiment, the at least one wetting resistant ply and the least one absorbent ply are both macroembossed and coin edged. In a further embodiment, the at least one wetting resistant ply and the least one absorbent ply are separately microembossed, macroembossed together, and coin edged together.

Plying, or ply bonding, is the act of joining two or more substrates. When the plies of the paper product are produced separately, the plies are plied together to form the paper product. In one embodiment, plying involves glue laminating the plies together. In another embodiment, plying involves the mechanical ply bonding of the plies. In a further embodiment, plying involves hot melt gluing the plies together. In yet another embodiment, plying involves emboss ply bonding the plies together.

Plying in the form of glue lamination may be accomplished by several different techniques. In one embodiment, plying involves glue laminating in a point to flat configuration. In another embodiment, plying involves glue laminating the plies together in a point to point configuration. A point to point configuration implies that the plies being glue laminated have been embossed or otherwise marked in some fashion as to create points, ridges, waves, lines, or some form of protrusion(s) that may either be registered together or nested to form the plied product. In a further embodiment, plying involves glue laminating the plies together in a point to point configuration with the Yankee or smoother side of the at least one wetting resistant ply on the outside. The glue may be applied by several different techniques. In one embodiment, the glue for plying by glue lamination is rolled onto one ply. In another embodiment, the glue for plying by glue lamination is rolled onto the at least one wetting resistant ply. In a further embodiment, the glue for plying by glue lamination is rolled onto the points or tips of one ply after microembossing. In yet another embodiment, the glue for plying by glue lamination is rolled onto the points or tips of the at least one wetting resistant ply after microembossing. In yet another embodiment, the glue for plying by glue lamination is rolled onto the points or tips of the at least one absorbent ply after microembossing. Separate microembossing of the plies along with glue lamination in a point to point configuration may be carried out by one apparatus, such as the point to point embossing units sold by OMET S.R.L. of Lecco, Italy. Each of the embodiments described may also describe rolling glue for plying by glue lamination onto the point of tips of at least one ply after macroembossing, without or without microembossing.

The glue or adhesive used for glue lamination may be any of those known to one of ordinary skill in the art. In one embodiment, the glue is a water-based synthetic resin. In another embodiment, the solids in the glue comprise more than 50% of a polyvinyl alcohol. In a further embodiment, the glue may comprise a polyamide-epichlorohydrin (PAE) resin. Two examples of glue are WB-2775M and WB-2746 manufactured by the H. B. Fuller Company of St. Paul, Minn.

The converting process for the paper products may also comprise a slitter apparatus to cut a given paper web into multiple webs. The converting process may further comprise a folder apparatus, if the paper products to be made require folding before packaging and/or shipment. Folding may be carried out by an apparatus manufactured by, for example, C. G. Bretting Manufacturing Co., Inc.

Figure 2:
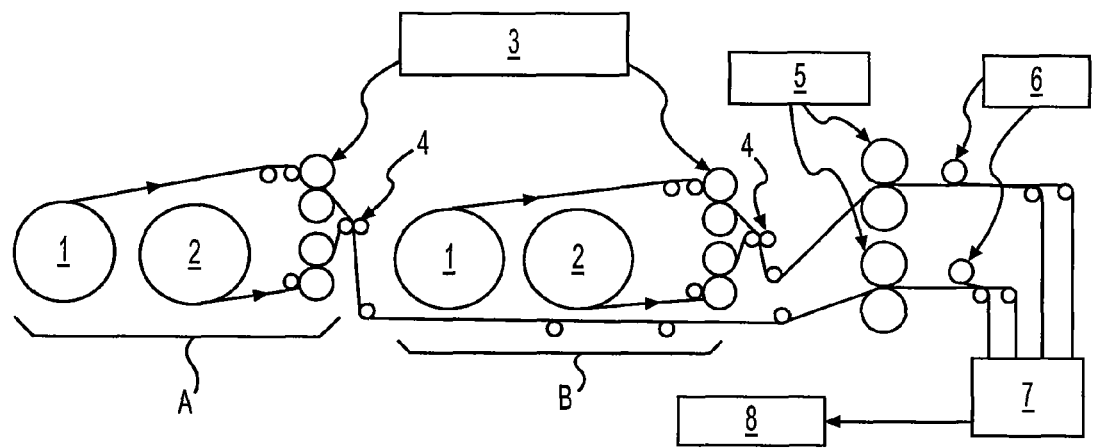
FIG. 2 is a schematic drawing of one embodiment of a converting process that may be used to produce paper products in the form of napkins in accordance with the present description.

FIG. 2 reveals one embodiment of a converting process that may be used to produce paper napkins in accordance with one embodiment of this description. Two rolls of absorbent ply 1 and two rolls of wetting resistant ply 2 are pre-calendered and loaded into the two sections A and B of the converting apparatus. Each of the plies 1 and 2 are passed through separate microembossing stations 3 before being passed through plying stations 4 that glue laminate the two plies together in a point to point configuration. The glue laminated product is then carried to the macroembossing stations 5 that may impart one or both of a central pattern and edge pattern to the paper. The macroembossed product is then passed through slitter assemblies 6 to create two strips of product per section of the converting apparatus. The four strips of product are then introduced into the folder 7 that creates finished napkin products 8.

As one example of a paper product, a paper napkin is prepared from one absorbent ply and one hydrophobic ply with AKD as the at least one hydrophobe. The two plies are calendered to a TMI friction of about 0.43, separately microembossed with about 40 to about 60 dots per square centimeter, and then glue laminated in a point to point configuration. The laminated product is then macroembossed, slit, and folded into the finished napkin. The napkin possesses a caliper of at least about 110 mils/8 sheets and a GM modulus between about 20 to about 50 g/% stretch for a 1 inch sample.

Among others, three basic tests were used to assess the paper plies: water absorption rate (WAR), strike through, and contact angle. WAR is a test to determine the rate at which a paper product or ply absorbs a quantity of water or other liquid placed on its surface. Strike through is a test to determine the ability of a paper product or ply to prevent the passage of water through its thickness, graded on a pass/fail basis. Contact angle is the angle at which a quantity of water contacts the surface of a paper product or ply, a measurement of its surface energy. Each of these tests are discussed in greater detail below.

The water absorption rate (WAR) of a paper product or ply is the time it takes for a drop of water to wick into the paper product or ply such that the liquid is no longer visible as a distinct drop. For the paper plies that comprise most commercially available paper napkins, the WAR is almost instantaneous, i.e., less than two seconds. The at least one absorbent ply may exhibit a WAR similar to that of the paper plies of commercially available paper napkins. In one embodiment, the WAR of the at least one absorbent ply is less than about two seconds. In another embodiment, the WAR of the at least one absorbent ply is less than about five seconds. In a further embodiment, the WAR of the at least one absorbent ply is less than about ten seconds. In yet another embodiment, the WAR of the least one absorbent ply is less than the WAR of the at least one wetting resistant ply. In another embodiment, the absorbency of the at least one absorbent ply is greater than the absorbency of the at least one wetting resistant ply because the WAR of the at least one absorbent ply is less than the WAR of the at least one wetting resistant ply.

The at least one wetting resistant ply, on the other hand, may exhibit a longer WAR than the paper plies of commercially available paper napkins. In one embodiment, the WAR of the wetting resistant ply is greater than about 5 seconds. In another embodiment, the WAR of the wetting resistant ply is greater than about 50 seconds. In yet another embodiment, the WAR of the wetting resistant ply is greater than about 100 seconds. In a further embodiment, the WAR of the wetting resistant ply is greater than about 200 seconds. In yet a further embodiment, the WAR of the at least one wetting resistant ply is greater than the WAR of the at least one absorbent ply.

One test for WAR involves conditioning a sample of the ply or plies to be tested to about 23° C. and about 50% relative humidity. The conditioned sample is secured lightly in a frame without substantial stretching in either the machine or cross directions, but with sufficient tension in all directions such that the sample is smooth. The sample is suspended in the frame horizontally such that both surfaces of the sample are not in contact with any other surface; that is, both surfaces of the sample contact only air, such a third surface in contact with the sample can significantly influence moisture penetration delay times. While at room temperature, the surface side of the sample to be tested is oriented upwardly and a droplet of colored water is placed gently thereon. In one version of the test, the droplet is approximately 0.01 mL. In another version of the test, the droplet is approximately 0.1 mL. A timer is started simultaneously with the placement of the colored water droplet on the surface and is stopped when the droplet is completely absorbed into the sheet and no longer projects upwardly from the surface of the sample as observed with the naked eye. The time is recorded as the WAR. A similar test setup and procedure may be used when the absorbency of a liquid other than water is to be tested. As such, WAR is not necessarily limited to water or aqueous solutions, in spite of its name.

Strike through is a test to determine the ability of a paper product or ply to prevent the passage of water or other liquid through its thickness, graded on a pass/fail basis. A paper product or ply passing the strike through test is said to exhibit moisture strike through resistance. One test for strike through involves first curing a sample ply for about 5 minutes at about 105° C., which is then cooled for about 5 minutes. Second, a 4-ply test sample is constructed on blotter paper, including (1) a non-sample ply on the top; (2) two sample plies in the middle; and (3) a non-sample ply on the bottom that contacts the blotter paper. In one embodiment, the 4-ply test sample includes (1) an absorbent ply on the top; (2) two wetting resistant plies in the middle; and (3) an absorbent ply on the bottom. In another embodiment where the test involves a two-ply napkin made in accordance with the present description, the 4-ply test sample is prepared by folding the napkin such that the wetting resistant plies are on the inside of the folded test sample and the absorbent plies are on the outside. Third, a moderate amount of colored water (about 0.3 g or 5 drops) is poured or placed onto the top ply of the test sample. After about five seconds, the test sample is moved to observe the water wet-through trace on the surface of the blotter paper. To pass the test, there can no be no trace of the colored water on the blotter paper. In one embodiment, a paper product may be said to exhibit strike through resistance if it passes the described strike-through test. The test may also be performed with other liquids, such as oils and emulsions, for which knowledge of strike through resistance is desired. As such, strike through is not limited to water or aqueous solutions.

While the strike through test may provide useful information about the water resistance of a given paper product, a contact angle test may provide useful information about the water or liquid resistance of a given paper ply. A contact angle is defined as the angle between a tangent to a liquid droplet surface at its air/liquid interface at the droplet's line of contact with a solid and the solid substrate surface upon which the droplet rests (as measured through the liquid). A contact angle may be measured at any point at the line of contact of the three phases: air, liquid, and solid. "Contact angle," as used herein, refers to the contact angles of a paper ply with water or other liquid at room temperature as measured with a goniometer.

The contact angle is one method of measuring the surface free energy of a ply. In general, plies with higher surface free energies have higher initial contact angles and increased moisture strike through resistance. An initial contact angle of 0° represents a lack of moisture strike through resistance. In one embodiment, the at least one absorbent ply exhibits an initial contact angle of about 0°. In another embodiment, the at least one absorbent ply exhibits an initial contact angle less than the initial contact angle of the at least one wetting resistant ply.

Figure 5:
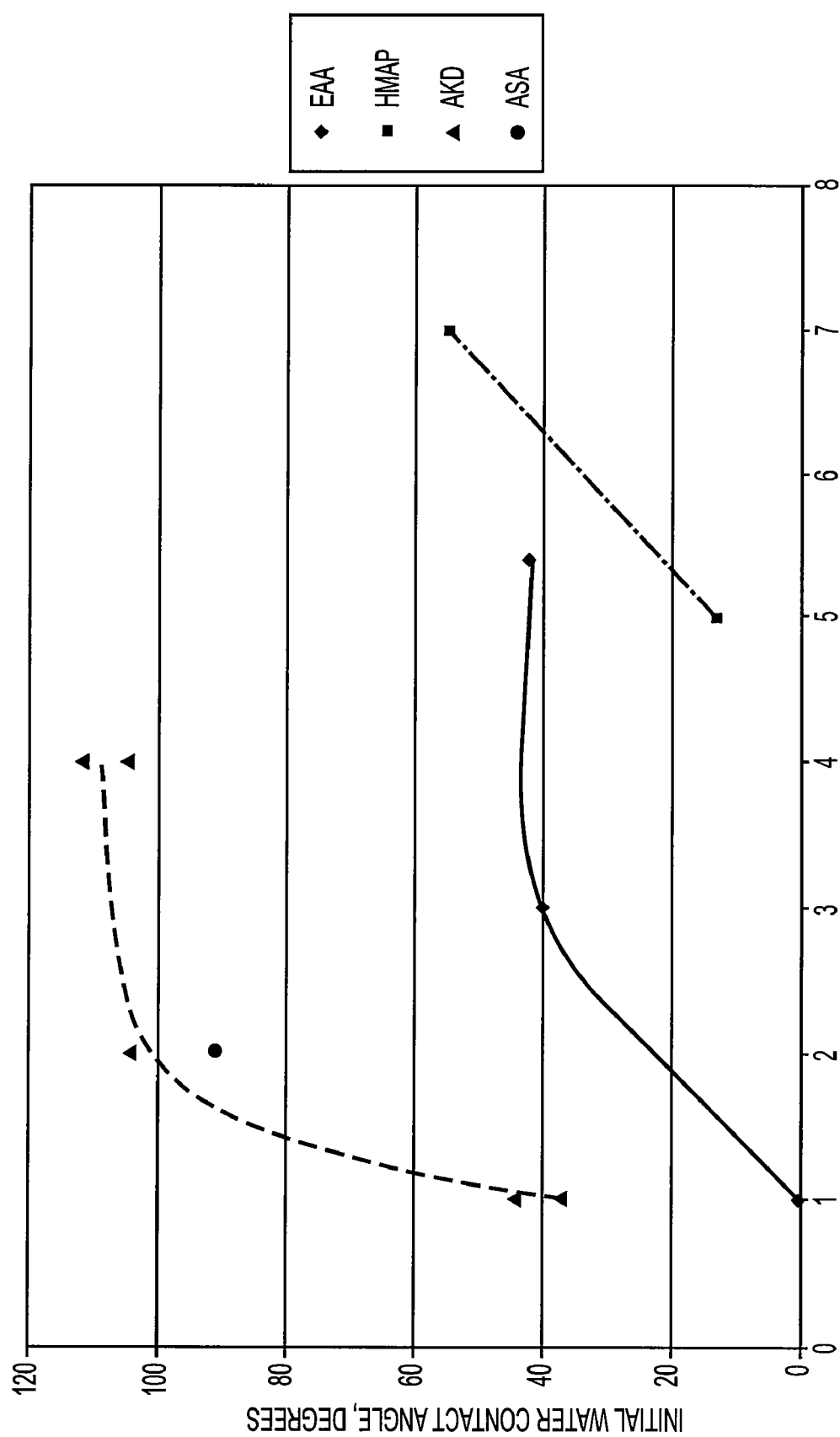
FIG. 5 is a graph showing, for the different hydrophobes of Example 1, the initial contact angle in degrees versus the amount of hydrophobe added in pounds per ton.

Contact angles reported herein were determined by adhering a sample ply or plies to a 75×25 mm glass microscope slide prepared to receive the sample with a strip of double-sided adhesive tape. The sample ply was adhered to the tape with the surface of the ply to be tested oriented upwardly. The slide was then placed on the goniometer sample stage and a 0.01 mL drop of distilled water was placed on the surface to be tested. The image of the droplet/sheet sample interface was captured at the moment just after contact using a telescopic lens and a video signal recorded. The video signals were then analyzed for the initial contact angle by drawing a tangent vector from the line of contact between the water droplet and the sheet surface, as shown in FIG. 5. Any suitable goniometer may be employed; one example is a goniometer available from Rame-Hart Inc., operated with a Panasonic® camera model WV-BP312 and Java-based software to measure the initial contact angle. Video signals may also be recorded at multiple time intervals after contacting the droplet to the surface in order to measure the change in contact angle over time.

An initial contact angle of greater than 90° reveals a ply that may exhibit increased moisture strike through resistance. In one embodiment, the wetting resistant ply exhibits an initial contact angle of at least about 80°. In another embodiment, the wetting resistant ply exhibits an initial contact angle of at least about 90°. In a further embodiment, the wetting resistant ply exhibits an initial contact angle of at least about 100°. In yet another embodiment, the wetting resistant ply exhibits an initial contact angle of at least about 110°. In yet a further embodiment, the wetting resistant ply exhibits an initial contact angle of at least about 130°. In another embodiment, the wetting resistant ply exhibits an initial contact angle greater than the initial contact angle of the at least one absorbent ply.

A ply that maintains a high contact angle over the time of exposure to moisture also may be said to exhibit moisture strike though resistance. In one embodiment, the wetting resistant ply exhibits a contact angle of at least about 70° after contact with liquid for about five minutes. In another embodiment, the wetting resistant ply exhibits a contact angle of greater than about 80° for five minutes after contact. In a further embodiment, the wetting resistant ply exhibits a contact angle of greater than about 90° for five minutes after contact. In yet another embodiment, the wetting resistant ply exhibits a contact angle of greater than about 110° for five minutes after contact.

The basis weight of a ply or paper may be measured with an accurate balance. Eight 3 by 3 inch specimens are cut and the, if a finished product is tested, the specimens should each have the same number of plies as the finished product. After the weight of the specimens is determined, the basis weight in pounds per ream (500 sheets @ 24 in.×36 in.=3000 square feet) equals 952.4× the measured weight, divided by the square of the inches. If eight 3 by 3 inch specimens are used, then the square of the inches is 72. Other size specimen samples may be used if convenient and the square of the inches is adjusted accordingly in the calculation.

The wet tensile strength of a paper ply or paper product according to the present disclosure may be measured using a three-inch wide strip of sample that is folded into a loop, clamped in a special fixture termed a Finch Cup, then immersed in water. From a sample is cut two CD specimens, 3 inches wide by at least about 4.5 inches long. The Finch Cup, which is available from High-tech Manufacturing Services, Inc. of Vancouver, Wash., is mounted onto a tensile tester with the flange of the Finch Cup clamped by the tester's lower jaw and the ends of tissue loop clamped into the upper jaw of the tensile tester. The sample is immersed in water that has been adjusted to a pH of 7.0±0.1 and the tensile is tested after a 5 second immersion time. Normally the cross direction wet tensile is tested, as the strength in this direction is generally lower than that of the machine direction and the tissue is more likely to fail in use in the cross-machine direction. The wet tensile strength of a "cured" or aged sample may be measured, to determine the effect, if any, on time and wet tensile strength for a given ply or product.

Tensile strength of a ply or paper product produced in accordance with the present disclosure may be measured in the machine direction and cross-machine direction on a tensile tester with the gauge length set to 3 inches. The area of tissue tested is assumed to be 3 inches wide by 3 inches long (the distance between the grips). In practice, the length of the samples may be the distance between lines of perforation, in the case of machine direction tensile strength, and the width of the samples is the width of the roll, in the case of cross-machine direction tensile strength. The maximum load and stretch are recorded for each direction. The results are reported in units of "grams per 3-inch" or "g/3 in."; a more complete rendering of the units would be "grams per 3-inch by 3-inch strip."

The break modulus (also referred to as tensile stiffness, stiffness modulus, or tensile modulus) may be determined by the procedure for measuring tensile strength and stretch described above. The modulus of a ply or paper product is the peak load divided by the stretch at the peak. The geometric mean (GM) modulus may be determined by taking the square root of the product of the machine direction modulus and the cross direction modulus, and the overall GM modulus may be determined by averaging the GM modulus for multiple replicates on the same sample.

Example One

In example one, the following five hydrophobes were evaluated for use as the at least one hydrophobe in the hydrophobic ply: EAA, HMAP, AKD, rosin, and ASA.

Paper plies were made on a pilot scale papermaking machine with 20% refined softwood fibers (Marathon, 480 CSF, 42 minutes) and 80% refined hardwood fibers (Aracruz, 500 CSF, 10 minutes open). The paper plies were dried on a Yankee dryer using a 10° creping blade or a square blade, depending on the crepe structure. A coating of 90% Cevol® 09-523, 5% Hercules 1184, and 5% Hercules 1145 was applied to the Yankee dryer for all samples. After drying, the paper plies were lightly calendered. Each paper ply was produced to possess the physical characteristics within the ranges listed in Table 1:

TABLE 1

Physical Characteristics of Trial One Plies

| Characteristic | Target | Lower | Upper |
| --- | --- | --- | --- |
| Basis Weight (pounds/ream) | 10.5 | 9.5 | 11.00 |
| Caliper (mils/8 sheets) | 33.0 | 28.0 | 38.0 |
| MD Dry Tensile Strength (g/3 in.) | 1000 | 750 | 1250 |
| CD Dry Tensile Strength (g/3 in.) | 500 | 350 | 650 |
| GMT (g/3 in.) | 700 | 500 | 900 |
| Tensile Ratio | 2.00 | N/A | N/A |
| MD Stretch (%) | 14.0 | 9.5 | N/A |
| CD Wet Tensile Strength (g/3 in.) | 60 | 35 | N/A |
| CD Wet/Dry Ratio | 0.12 | N/A | N/A |
| Moisture (USL-Peak) | 5.4 | N/A | 8.0 |

The EAA used in Trial One was prepared from Primacor™ 5980 supplied by Dow Chemical of Midland, Mich. A 2 L glass beaker was charged with 1 L deionized water, to which 40.70 g of sodium hydroxide pellets (1.1 equivalents of acrylic acid content) were added during rapid mechanical stirring with a plastic rotor. After the sodium hydroxide dissolved and the temperature of the solution fell below 40° C., 333 g of Primacor™ 5980 were added during rapid stirring, after which the temperature of the solution was gradually raised to 92° C. The solution then formed a bluish-white EAA emulsion and was cooled to about 50 to about 60° C. for storage.

The HMAP used in Trial One was prepared from Chevron® PA-18 sodium salt supplied by Chevron. In a steam jacketed kettle, 56.76 g (1.42 mol) of sodium hydroxide pellets were dissolved in 15 L of deionized water, to which 227 g (0.66 mol) of Chevron® PA-18 were added during vigorous stirring. The temperature of solution was gradually raised to 85° C. and maintained until a clear HMAP fluid was formed.

The AKD used in Trial One was Novasize AKD™ 3016 from Georgia-Pacific Chemicals, delivered as a 16% total solids solution and diluted to about 1% solids prior to addition to the fiber furnish.

The neutral rosin used in Trial One was Novamax™ rosin from Georgia-Pacific Chemicals, delivered as a 34.7% total solids solution and diluted to about 1% solids prior to addition to the fiber furnish.

The ASA used in Trial One was Novasize™ ASA BZ38 from Georgia-Pacific Chemicals, delivered as a 34.7% total solids solution and diluted to about 1 to about 2% solids prior to addition to the fiber furnish and after emulsification with Novasize™ EML 1520 from Georgia-Pacific Chemicals. The ASA emulsion used was prepared by mixing 280 g water and 60.0 g Novasize™ EML 1520 in a blender at low speed, to which 60.0 g was Novasize™ ASA BZ38 was solely added with care to avoid direct contact of the ASA with the blender walls and blades. The resulting composition was mixture at high speed for four minutes to give a 15% by weight ASA emulsion, which was then diluted with cold water to about 1 to about 2% solids. The emulsion prepared in this manner possessed sufficient stability to be used within 4 to 5 hours.

Experimental plies were made with the addition of the type and amount of hydrophobes listed in Table 2, which also reports the results of tests for WAR (0.01 mL and 0.1 mL on Yankee side of the ply) and contact angle. In some tests, a wet strength resin (WSR) was used in form of a PAE resin sold as AMRES® HP25 by the Georgia-Pacific Corp. Each hydrophobe was added after the addition of any listed WSR. Plies listed as "aged" in Table 2 were either allowed to sit for 4 to 6 days at ambient conditions before testing or heat-treated to simulate aging for 4 to 6 days at ambient conditions.

TABLE 2

Parameters and Results from Trial One

| Hydrophobe | Addition Levels (pounds/ton) | WAR with 0.01 mL (sec.) | WAR with 0.1 mL (sec.) | Contact Angle (°) |
|---|---|---|---|---|
| Control | 3.0 WSR | 1.4 | 16.7 | N/A |
| EAA | 1.0 + 4.5 WSR | 8.5 | 105.8 | 0 |
|  | 3.0 + 7.0 WSR | 83.3 | 300.0+ | 40 |
|  | 5.4 + 10 WSR | 84.9 | 300.0+ | 42 |
| EAA Aged | 1.0 + 4.5 WSR | 15.5 | 212.7 | N/A |
|  | 3.0 + 7 WSR | 101.8 | 300.0+ | N/A |
|  | 5.4 + 10 WSR | 58.4 | 300.0+ | N/A |
| HMAP | 1.0 + 5.5 WSR | 1.2 | 19.6 | N/A |
|  | 3.0 + 10.5 WSR | 17.2 | 299.7 | 13 |
|  | 7.0 + 20.5 WSR | 200.0 to 300.0 | 300.0+ | 55 |
| HMAP Aged | 3.0 + 10.5 WSR | 19.5 | 299.6 | N/A |
|  | 5.0 + 15.5 WSR | 8.6 | 135.4 | N/A |
|  | 7.0 + 20.5 WSR | 65.3 | 300.0+ | N/A |
| AKD | 1.0 | 22.9 | 300.0+ | 37 |
|  | 2.0 | 300.0+ | 300.0+ | 104 |
|  | 4.0 | 300.0+ | 300.0+ | 105 |
| AKD Aged | 1.0 | 65.7 | 300.0+ | 44 |
|  | 2.0 | 300.0+ | 300.0+ | 104 |
|  | 4.0 | 300.0+ | 300.0+ | 112 |
| Neutral Rosin | 1.0 | 3.4 | 35.8 | N/A |
|  | 3.0 | 3.5 | 43.1 | N/A |
|  | 6.0 | 4.1 | 69.7 | N/A |
|  | 10.0 | 3.7 | 60.7 | N/A |
| ASA | 2.0 | 142.7 | 300.0+ | 91 |
|  | 4.0 | 300.0+ | 296.0 | N/A |

Figure 3:
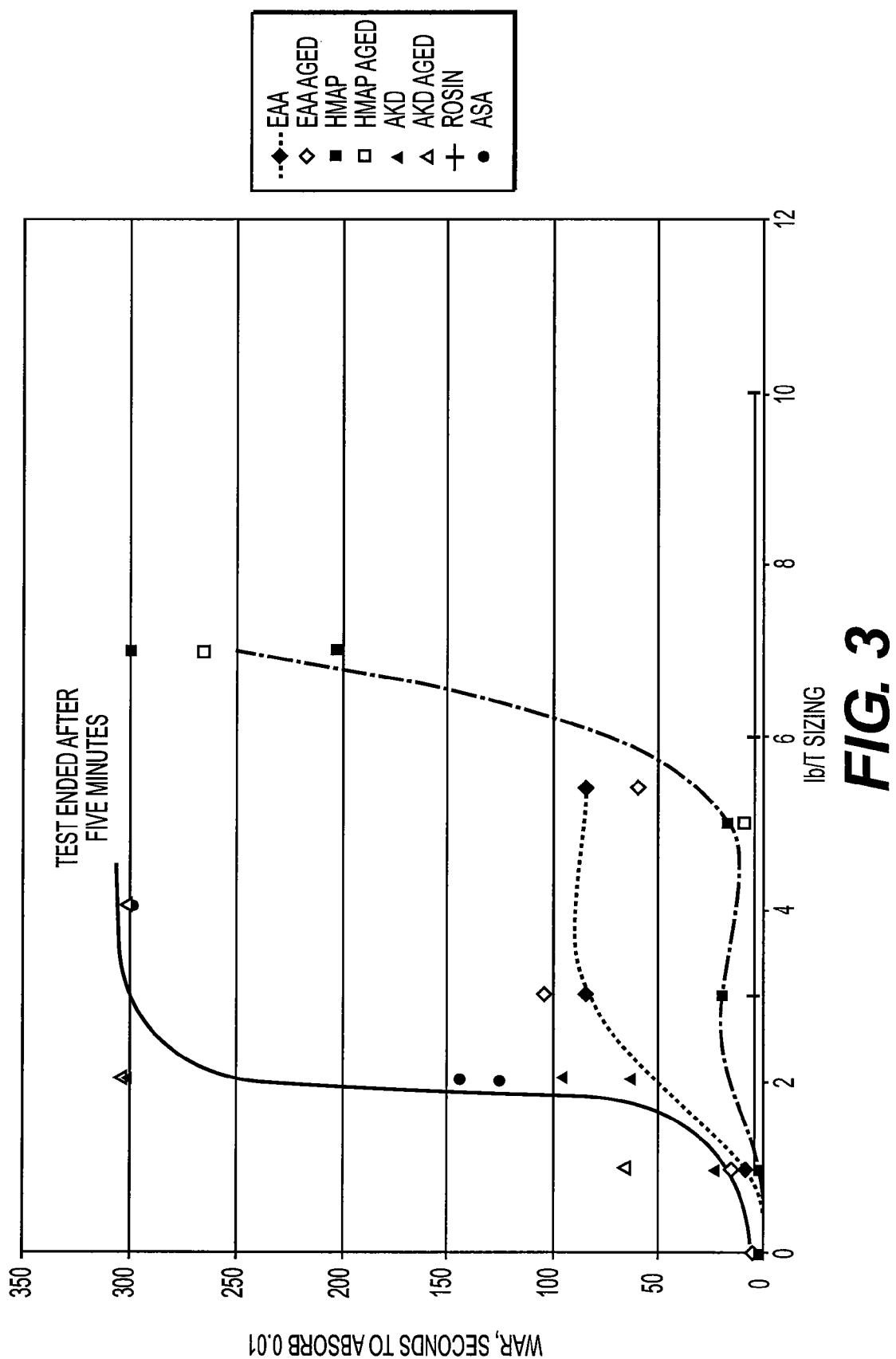
FIG. 3 is a graph showing, for the different hydrophobes of Example 1, the WAR in seconds to absorb 0.01 mL of liquid versus the amount of hydrophobe added in pounds per ton.

FIG. 3 shows for the different hydrophobes the WAR in seconds to absorb 0.01 mL of liquid versus the amount of hydrophobe added in pounds per ton. As noted by FIG. 3, the WAR test ended after 300 seconds; plies with WAR times greater than 300 seconds are listed as "300.0+" in Table 2.

Figure 4:
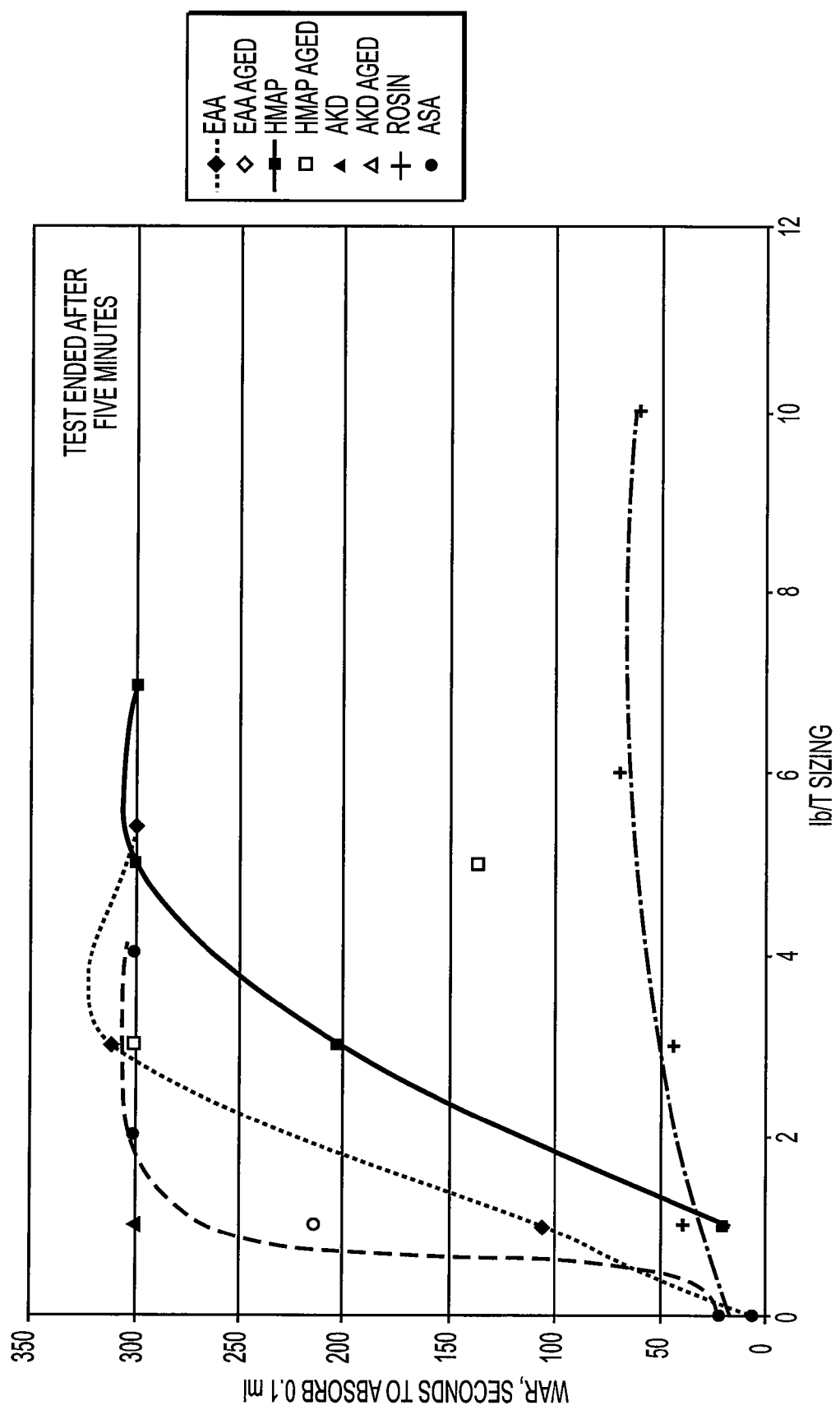
FIG. 4 is a graph showing, for the different hydrophobes of Example 1, the WAR in seconds to absorb 0.1 mL of liquid versus the amount of hydrophobe added in pounds per ton.

FIG. 4 shows for different hydrophobes the WAR in seconds to absorb 0.1 mL of liquid versus the amount of hydrophobe added in pounds per ton. As noted by FIG. 4, the WAR test ended after 300 seconds; plies with WAR times greater than 300 seconds are listed as "300.0+" in Table 2.

FIG. 5 shows for different hydrophobes the initial contact angle in degrees versus the amount of hydrophobe added in pounds per ton. As can be seen in FIG. 5, the test samples with ASA at 2 lb/T, AKD at 2 lb/T, and AKD at 4 lb/T each showed an initial contact angle about 90°.

Several of the hydrophobic plies produced in Trial One were separately microembossed, mated with an absorbent ply, and ply bonded to create a 2-ply paper product. Various properties of these products were tested, and specifically the Strike Through of each product was tested using 0.3 g of blue water placed on the product for 5 seconds. The results from these tests are presented in Table 3.

TABLE 3

2-Ply Paper Products made from Hydrophobic Plies of Trial One

| Hydrophobe (lbs/T) | WSR (lbs/T) | Microemboss Element Depth (mils) | Basis Weight (lb/ream) | Caliper (mils/8 sheets) | Tensile MD (g/3 in.) | Stretch MD (%) | Tensile CD (g/3 in.) | Stretch CD (%) |
|---|---|---|---|---|---|---|---|---|
| AKD, 4.0 | 3.0 | 60 | 20.0 | 75.2 | 2852 | 13.5 | 1174 | 4.4 |
| AKD, 4.0 | 3.0 | 80 | 19.8 | 87.8 | 2851 | 11.6 | 951 | 4.7 |
| AKD, 2.0 | 3.0 | 60 | 20.8 | 74.0 | 2825 | 10.9 | 1213 | 3.9 |
| AKD, 3.0 | 1.0 | 60 | 20.4 | 70.6 | 2831 | 10.6 | 1079 | 4.3 |
| AKD, 3.0 | 1.0 | 80 | 20.1 | 91.3 | 2467 | 9.3 | 913 | 4.7 |
| ASA, 2.0 | 3.0 | 60 | 20.0 | 76.3 | 2516 | 13.2 | 1079 | 4.0 |
| HMAP, 7.0 | 20.5 | 60 | 20.3 | 73.7 | 3273 | 14.3 | 1396 | 4.5 |
| EAA, 5.4 | 10.0 | 60 | 20.3 | 81.3 | 2904 | 14.1 | 1081 | 4.2 |

| Hydrophobe (lbs/T) | Wet Tensile Finch CD (g/3 in.) | Wet Tensile Finch Cured CD (g/3 in.) | Break Modulus GM (gms/%) | Break Modulus MD (gms/%) | Break Modulus CD (gms/%) | Strike Through Test |
|---|---|---|---|---|---|---|
| AKD, 4.0 | 135 | 148 | 239.3 | 213.5 | 268.4 | Passed |
| AKD, 4.0 | 132 | 124 | 219.1 | 245.3 | 196.3 | Passed |
| AKD, 2.0 | 150 | 163 | 281.6 | 253.9 | 312.3 | Passed |
| AKD, 3.0 | 131 | 148 | 266.5 | 272.1 | 261.0 | Failed |

TABLE 3-continued

2-Ply Paper Products made from Hydrophobic Plies of Trial One

| | | | | | | |
|---|---|---|---|---|---|---|
| AKD, 3.0 | 113 | 118 | 222.4 | 261.8 | 189.0 | Failed |
| ASA, 2.0 | 110 | 132 | 219.3 | 185.9 | 258.6 | Passed |
| HMAP, 7.0 | 222 | 243 | 275.2 | 232.9 | 327.6 | Failed |
| EAA, 5.4 | 145 | 182 | 227.1 | 209.6 | 246.1 | Failed |

Example Two

A two-ply paper product in accordance with the present description was produced in a full-scale CWP mill. Both paper plies were manufactured according to the parameters given in Table 5 to achieve the listed target, minimum, and maximum physical properties, and possess the listed measured physical properties, given in Table 4.

TABLE 4

Physical Properties of Trial Two Plies

| | Desired Values | | | Absorbent | Hydrophobic |
|---|---|---|---|---|---|
| Physical Property | Target | Min | Max | Ply | Ply |
| Basis Weight at Reel (pounds/ream) | 10.2 | 9.6 | 10.8 | 10.2 | 10.8 |
| Reel Caliper (mils/8 sheets) | 33 | 28 | 38 | 32 | 34 |
| Rewinder Caliper (mils/8 sheets) | 23.0 | 20.0 | 26.0 | N/A | 23.9 |
| MD Dry Tensile (g/3 in.) | 1000 | 750 | 1250 | 1043 | 1152 |
| CD Dry Tensile (g/3 in.) | 500 | 350 | 750 | 471 | 493 |
| MD Stretch (%) | 14.0 | 9.5 | N/A | 12.0 | 12.0 |
| CD Finch Wet Tensile (g/3 in.) | 80 | 40 | 120 | 94 | 104 |
| TMI Friction (2-Ply, after Calendering) | 0.43 | 0.27 | 0.59 | 0.41 | N/A |

TABLE 5

Process Conditions for Trial Two Plies

| Category | Property | Absorbent Ply | Hydrophobic Ply |
|---|---|---|---|
| Process Conditions | Refiner (kW) | 91 | 88 |
| | Yankee (fpm) | 3,366 | 3,322 |
| | Yankee (psi) | 100.0 | 115.2 |
| | Crepe (%) | 15.9 | 16.9 |
| | Production (tons/hour) | 3.8 | 3.5 |
| | Hoods (° F.) | 462 | 365 |
| | Moisture (%) | 5.9 | 5.5 |
| | R/D | −150 | −148 |
| Chemicals | AKD (pounds/ton) | 0 | 5.00 |
| | WSR (pounds/ton) | 7.0 | 3.0 |
| Creping | 1145 (mL/min) | 10 | 20 |
| | 4609 (mL/min) | 27 | 10 |
| Furnish Data | Hardwood (%) | 30 | 30 |
| | Softwood (%) | 40 | 40 |
| | SEC (%) | 15 | 15 |
| | Broke (%) | 15 | 15 |

A reel of the absorbent ply was made first and loaded onto a rewinder. The hydrophobic ply was then produced (with the AKD being added to the stuffbox and the WSR being added at the suction side of the machine chest pump) and plied (Yankee side out) with the absorbent ply reel such that the absorbent ply was on the outside. The plied product was then slit on the rewinder to produce ten 2-ply, 40" diameter, 24" wide rolls.

Figure 6:
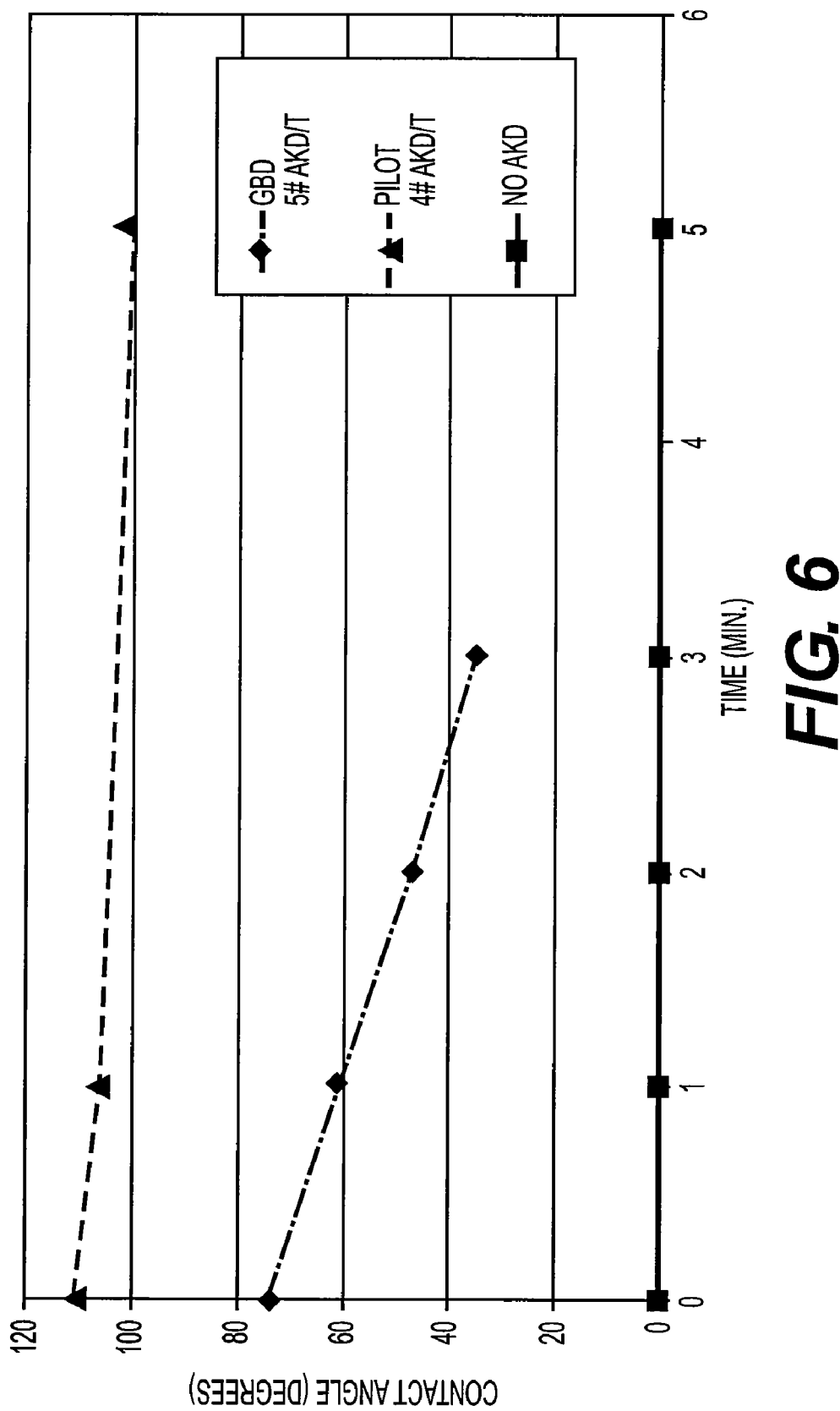
FIG. 6 is a graph displaying the results of the contact angle tests from Example 2 by plotting the measured contact angle in degrees versus the time of contact in minutes.

The contact angle of the hydrophobic ply side of the sample product was measured initially and at 1, 2, and 3 minutes after contact. FIG. 6 displays the results of the contact angle tests by plotting the measured contact angle in degrees versus the time in minutes. For comparison, FIG. 6 displays the results from similar tests on a sample of the paper ply from Example One with 4 pounds/Ton AKD. FIG. 6 reveals that hydrophobic plies produced in a mill have a smaller initial contact angle, and smaller contact angles over time, than hydrophobic plies produced on a pilot machine. The smaller WAR may be attributed to less AKD being retained in the mill-produced ply and that ply being made from a furnish with less clean fibers than the pilot machine plies.

Example Three

A two-ply paper product in accordance with the present description was produced on a full-scale CWP papermaking machine. An absorbent ply was used from Example Two. The hydrophobic paper ply was manufactured according to the parameters given in Table 6:

TABLE 6

Process Conditions for Trial Three Hydrophobic Ply

| Process Condition | Centerline or Parameter |
|---|---|
| Furnish | 30% Hardwood |
| | 40% Softwood |
| | 15% SEC |
| | 15% Broke |
| Refining Level | As Needed |
| Crepe Blade | Square |
| Reel Crepe | 15% |
| Reel Moisture | 5.0% |
| Hydrophobe | Novasize ™ AKD 3016 |
| | 2.0 to 8.0 pounds/ton |
| Wet Strength Resin | AMRES ® 15 HP |
| | 2.0 to 4.0 pounds/ton |
| Yankee Coating/Release Package | Hercules Crepetrol 1145 |
| | Rezosol 4609 |

A reel of the absorbent ply from Example Two was loaded onto a rewinder. The hydrophobic ply was then produced (with the WSR being added to the stuffbox and the AKD being added at the suction side of the machine chest pump) and plied (Yankee side out) with the absorbent ply reel such that the absorbent ply was on the outside. The plied product was then slit on the rewinder to produce a 2-ply, 40" diameter, 24" wide roll.

Figure 7:
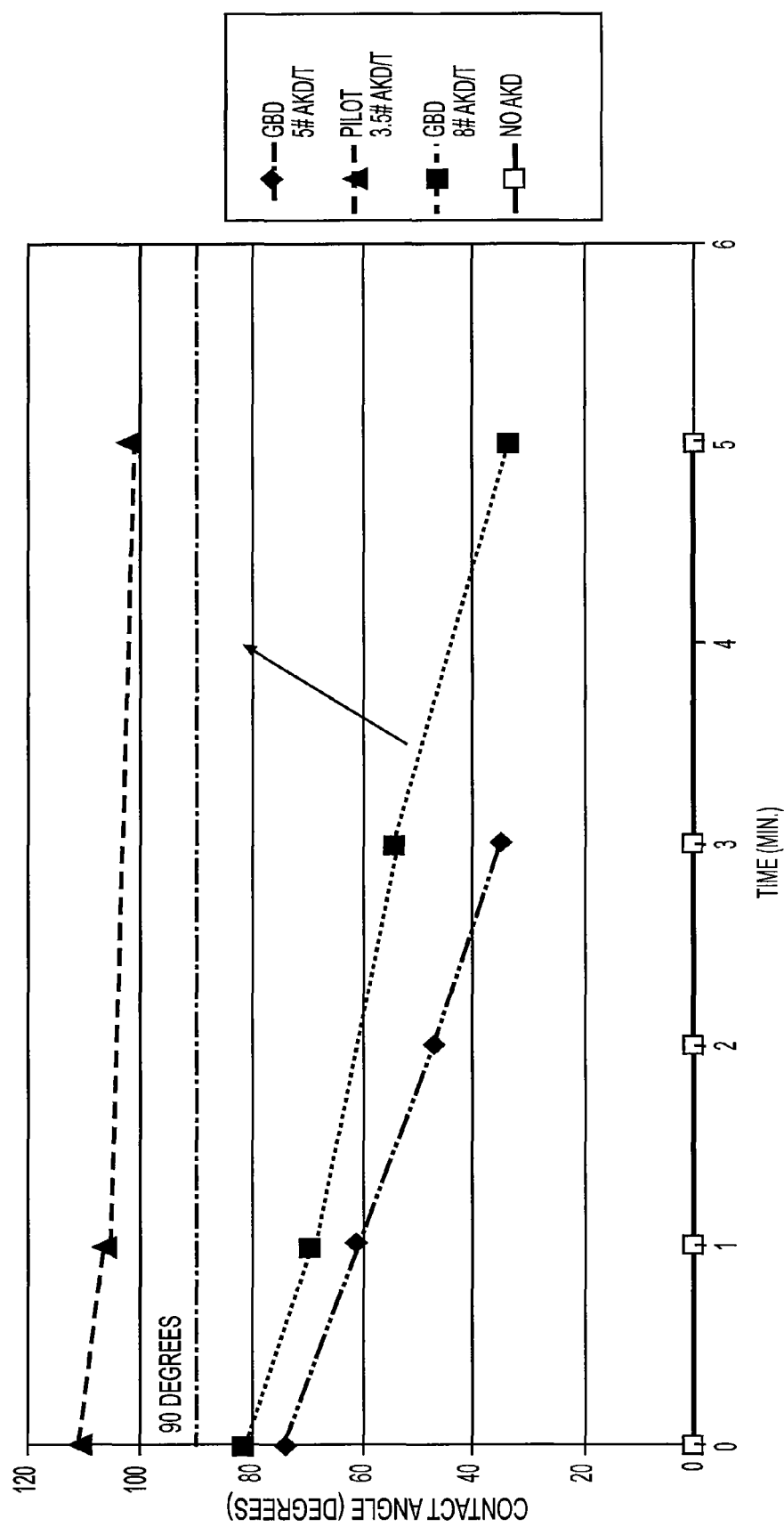
FIG. 7 is a graph displaying the results of the contact angle tests from Example 3 by plotting the measured contact angle in degrees versus the time of contact in minutes.

The contact angle of the hydrophobic ply side of the sample product was measured initially and at 1, 3, and 5 minutes after contact. FIG. 7 displays the results of the contact angle tests by plotting the measured contact angle in degrees versus the time in minutes. For comparison, FIG. 7 displays the results from similar tests on a sample of the paper ply from Example One with 4 pounds/Ton AKD and a sample of the paper ply from Example Two. FIG. 7 reveals that the Trial Two hydrophobic plies have a smaller initial contact angle, and smaller contact angles over time, than the hydrophobic plies produced in Example Three. The larger contact angle may be attributed to the addition of the AKD at the suction side of the machine chest pump, which improved contact time with the fibers and enabled better mixing.

Example Four

A two-ply paper product in accordance with the present description was produced in a full-scale CWP mill. In this trial, two different hydrophobic plies were made: one with the at least one hydrophobe sprayed onto the surface of the hydrophobic ply after the suction pressure roll (i.e., sprayed onto the air-side of the sheet while on the Yankee dryer) and another with the at least one hydrophobe added to the machine chest pump at the wet end. The paper plies were manufactured according to the parameters given in Tables 8 and 9 to achieve the listed target, minimum, and maximum physical properties, and possess the listed measured physical properties, given in Table 7:

TABLE 7

Physical Properties of Trial Four Plies

| Physical Property | Desired Values | | | Absorbent Ply | Hydrophobic Ply - Spray | Hydrophobic Ply - Wet End |
| --- | --- | --- | --- | --- | --- | --- |
| | Target | Min | Max | | | |
| Basis Weight at Reel (pounds/ream) | 11.7 | 11.1 | 12.3 | 10.1 | 11.9 | 11.6 |
| Reel Caliper (mils/8 sheets) | 35.0 | 30.0 | 40.0 | 32.3 | 38.9 | 33.8 |
| Rewinder Caliper (mils/8 sheets) | 25.0 | 22.0 | 28.0 | N/A | 27.0 | 23.7 |
| MD Dry Tensile (g/3 in.) | 1000 | 750 | 1250 | 948 | 989 | 1249 |
| CD Dry Tensile (g/3 in.) | 500 | 350 | 750 | 495 | 479 | 610 |
| MD Stretch (%) | 14.0 | 9.5 | N/A | 14.7 | 15.9 | 16.4 |
| CD Finch Wet Tensile (g/3 in.) | 80 | 40 | 120 | 75 | 88 | 58 |

TABLE 8

Process Conditions for Example Four Hydrophobic Ply

| Process Condition | Centerline or Parameter |
| --- | --- |
| Furnish | 45% Hardwood |
| | 45% Softwood |
| | 15% Broke |
| Refining Level | As Needed |
| Crepe Blade | Square |
| Reel Crepe | 15% |
| Reel Moisture | 4.5% |
| Hydrophobe | Novasize ™ AKD 3016 |
| Wet Strength Resin | AMRES ® 15 HP |
| Retention Aid | Bufloc ® 5031 |
| Yankee Coating/Release | Hercules Crepetrol 1145 |
| Package | Hercules Rezosol 4609 |
| | Hercules 3690 (where * in Table 9) |

TABLE 9

Process Conditions for Example Four Plies

| Category | Property | Absorbent Ply | Hydrophobic Ply - Spray | Hydrophobic Ply - Wet End |
| --- | --- | --- | --- | --- |
| Process Conditions | Refiner (kW) | 108 | 102 | 121 |
| | Yankee (fpm) | 3650 | 3650 | 3600 |
| | Yankee (psi) | 88 | 125 | 105 |
| | Crepe (%) | 16.7 | 19.9 | 16.7 |
| | Hoods (° F.) | 501 | 609 | 616 |
| | Moisture (%) | 5.6 | 4.6 | 4.7 |
| Chemicals | Hydrophobe (pounds/ton) | 0 | 4.0 | 5.0 |
| | WSR (pounds/ton) | 3.2 | 3.3 | 1.4 |
| | Retention Aid (pounds/ton) | 0 | 2.0 | 2.0 |
| Creping | 1145 (mL/min) | 9 | 142 | 80 |
| | 4609 (mL/min) | 30 | 0 | 5* |

A reel of the absorbent ply was made first from the furnish listed in Table 8 with 7 pounds per ton of the wet strength resin listed in Table 8 added to the stuffbox. The spray and wet end hydrophobic plies were then produced, calendered, and slit on the rewinder to produce five, 1-ply, 40" diameter, 24" wide rolls of each ply. To produce the finished two-ply napkin product, the hydrophobic plies were plied (Yankee side out) with the absorbent ply, such that the absorbent ply was on the outside, by glue lamination with point to point emboss followed by a macroemboss and folding.

The physical properties of the produced napkin products were measured, including the strike through. Table 10 displays the results of these tests. Both products exhibits physical properties that approached or exceeded the target values and both products passed the strike through test.

TABLE 10

Finished Product Properties

| Physical Property | Target | Absorbent Ply + Hydrophobic Ply (Spray) | Absorbent Ply + Hydrophobic Ply (Wet End) |
| --- | --- | --- | --- |
| Basis Weight at Reel (pounds/ream) | 20.0 | 20.0 | 20.0 |
| Reel Caliper (mils/8 sheets) | 124.0 | 122.0 | 123.0 |

TABLE 10-continued

Finished Product Properties

| Physical Property | Target | Absorbent Ply + Hydrophobic Ply (Spray) | Absorbent Ply + Hydrophobic Ply (Wet End) |
|---|---|---|---|
| MD Dry Tensile (g/3 in.) | 1900 | 1604 | 1795 |
| CD Dry Tensile (g/3 in.) | 800 | 680 | 709 |
| CD Finch Wet Tensile (g/3 in.) | 130 | 105 | 92 |
| GM Break Modulus (g/% str) | 140.0 | 145.0 | 144.0 |
| GM Modulus (g/% str) | 30.0 | 29.0 | 34.0 |
| Strike Through Test Result | Pass | Pass | Pass |

Other embodiments of the described invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a multi-ply paper product, comprising:
   introducing at least one hydrophobe to an aqueous cellulosic furnish to form at least one fibrous hydrophobic ply;
   providing at least one fibrous absorbent ply having an absorbency greater than the at least one hydrophobic ply;
   separately microembossing the at least one hydrophobic ply and the at least one absorbent ply; and,
   glue laminating the at least one hydrophobic ply and the at least one absorbent ply in a point to point configuration;
   wherein the at least on hydrophobic ply exhibits an initial contact angle of at least about 80° with water, and wherein the multi-ply paper product is a napkin, towel, or tissue.

2. The method of claim 1, wherein the at least one hydrophobe is introduced to the aqueous cellulosic furnish through the suction side of a machine chest pump at the wet end of a papermaking machine.

3. The method of claim 1, further comprising spraying at least one hydrophobe onto the at least one hydrophobic ply after it is formed.

4. The method of claim 3, wherein the at least one hydrophobe is sprayed onto the formed at least one hydrophobic ply before the suction pressure roll.

5. The method of claim 1, wherein the at least one hydrophobe is alkyl ketene dimer.

6. The method of claim 1, wherein the microembossing provides at least about 40 to about 60 dots per square centimeter to the at least one hydrophobic ply and the at least one absorbent ply.

7. The method of claim 1, wherein the at least one hydrophobic ply is dried on a Yankee dryer.

8. The method of claim 7, further comprising spraying at least one hydrophobe onto the at least one hydrophobic ply before the Yankee dryer.

9. The method of claim 7, further comprising spraying at least one hydrophobe onto the at least one hydrophobic ply after the Yankee dryer.

10. The method of claim 7, wherein the at least one hydrophobic ply is glue laminated to the at least one absorbent ply with the Yankee side of the at least one hydrophobic ply on the outside.

11. The method of claim 1, further comprising macroembossing the paper product after glue laminating.

12. A method of making a multi-ply paper product, comprising:
    forming at least one fibrous wetting resistant ply through contacting at least one wetting resistant compound with an aqueous cellulosic slurry;
    providing at least one fibrous absorbent ply with a greater water absorbency rate that the at least one wetting resistant ply;
    microembossing at least one of the at least one wetting resistant ply and the at least one absorbent ply; and,
    plying the at least one absorbent ply and the at least one wetting resistant ply by glue lamination in a point-to-point or point-to-flat configuration;
    wherein the at least one wetting resistant fibrous ply exhibits an initial contact angle of at least about 80° with water, and wherein the multi-ply paper product is a napkin, towel, or tissue.

13. The method of claim 12, further comprising spraying at least one wetting resistant compound onto the at least one wetting resistant ply after it is formed.

14. The method of claim 12, wherein the at least one wetting resistant compound is a hydrophobe.

15. The method of claim 14, wherein the hydrophobe is chosen from at least one of alkenyl ketene dimer, alkyl ketene dimer, fluorocarbons, alkenyl succinic anhydride, HMAP, ethylene-acrylic acid, and neutral rosin emulsions.

16. The method of claim 15, wherein the hydrophobe is alkyl ketene dimer.

17. The method of claim 15, wherein the hydrophobe is a promoted hydrophobe.

18. The method of claim 17, wherein the hydrophobe is promoted alkyl ketene dimer.

19. The method of claim 12, wherein the at least one wetting resistant compound is a fluorochemical.

20. The method of claim 19, wherein the fluorochemical is chosen from at least one of perfluorinated polyacrylates; perfluorinated polyurethanes; linear perfluoropolyethers; molecules possessing single or twin perfluorinated chains, including those in the form of carboxylate and phosphate salts, including amphoteric and ammonium salt derivatives; a perfluoroalkyl chain or chains attached to a polar functional group; polytetrafluoroethylene; and perfluoroalkyl substituted carboxylic acids.

21. The method of claim 12, wherein the wetting resistant ply further comprises at least one retention aid.

22. The method of claim 21, wherein the at least one retention aid is a cationic coagulant.

23. The method of claim 12, wherein the at least one wetting resistant ply is dried on a Yankee dryer.

24. The method of claim 23, further comprising spraying at least one wetting resistant compound onto the at least one wetting resistant ply before the Yankee dryer.

25. The method of claim 23, further comprising spraying at least one wetting resistant compound onto the at least one wetting resistant ply after the Yankee dryer.

26. The method of claim 23, wherein the at least one wetting resistant ply is glue laminated to the at least one absorbent ply with the Yankee side of the at least one wetting resistant ply facing outward.

27. The method of claim 12, wherein the at least one wetting resistant ply and the at least one absorbent ply are glue laminated in a point to flat configuration.

28. The method of claim 12, wherein both the at least one wetting resistant ply and the at least one absorbent ply are separately microembossed and then glue laminated in a point to point configuration.

29. The method of claim 28, further comprising macroembossing the joined plies.

30. The method of claim 12, wherein the wetting resistant ply exhibits an initial contact angle of at least about 90° with water.

31. The method of claim 30, wherein the wetting resistant ply exhibits an initial contact angle of at least about 100° with water.

32. The method of claim 12, wherein the wetting resistant ply exhibits a contact angle of at least about 80° with water after five minutes of contact.

33. The method of claim 12, wherein the at least one absorbent ply is microembossed.

34. The method of claim 33, wherein the at least one absorbent ply and the at least one wetting resistant ply are glue laminated in a point-to-flat configuration.

35. The method of claim 12, wherein the microembossing imparts from about 40 to about 60 dots per square centimeter.

36. The method of claim 12, further comprising macroembossing the joined plies.

37. A method of making a multi-ply paper product, comprising:
  contacting cellulosic fibers of a first ply with at least one wetting resistant compound to form at least one fibrous wetting resistant ply,
  providing at least one fibrous absorbent ply with a greater water absorbency rate than the wetting resistant ply;
  microembossing at least one of the at least one wetting resistant ply and the at least one absorbent ply; and,
  plying the at least one wetting resistant ply and the at least one absorbent ply by glue lamination in a point-to-point or point-to-flat configuration,
  wherein the paper product exhibits strike through resistance, wherein the at least one wetting resistant fibrous ply exhibits an initial contact angle of at least about 80° with water, and wherein the multi-ply paper product is a napkin, towel, or tissue.

38. The method of claim 37, wherein the at least one wetting resistant compound contacts the cellulosic fibers of the first ply through the suction side of a machine chest pump at the wet end of a papermaking machine.

39. The method of claim 38, the at least one wetting resistant compound further contacts the cellulosic fibers of the first ply by spraying the compound onto the web.

40. The method of claim 37, wherein the at least one wetting resistant compound contacts the cellulosic fibers of the first ply by spraying the compound onto the web.

41. The method of claim 37, wherein the at least one wetting resistant compound is a hydrophobe.

42. The method of claim 41, wherein the hydrophobe is alkyl ketene dimer.

43. The method of claim 37, wherein the at least one wetting resistant compound is an oleophobe.

44. The method of claim 43, wherein the at least one wetting resistant compound is a perfluoroalkyl substituted carboxylic acid.

45. The method of claim 37, wherein the at least one absorbent ply is microembossed and the glue lamination is in a point-to-flat configuration.

46. The method of claim 37, wherein the at least one absorbent ply and the first ply are separately microembossed and the glue lamination is in a point-to-point configuration.

47. The method of claim 46, further comprising macroembossing the plied product.

* * * * *